(12) United States Patent  (10) Patent No.: US 7,850,826 B2
Alt  (45) Date of Patent: Dec. 14, 2010

(54) MULTI-STAGE FLASH EVAPORATOR

(76) Inventor: Friedrich Alt, 10 Pinewood, Irvine, CA (US) 92604

( * ) Notice: Subject to any disclaimer, the term of this patent is extended or adjusted under 35 U.S.C. 154(b) by 173 days.

(21) Appl. No.: 12/032,826

(22) Filed: Feb. 18, 2008

(65) Prior Publication Data

US 2009/0205944 A1  Aug. 20, 2009

(51) Int. Cl.
*B01D 3/02* (2006.01)
*B01D 3/06* (2006.01)
*B01D 3/32* (2006.01)

(52) U.S. Cl. .................. 202/153; 159/2.1; 159/2.3; 159/DIG. 8; 202/155; 202/173; 202/186; 203/88

(58) Field of Classification Search ............... 159/2.1, 159/2.3, 43.1, 901, DIG. 8; 202/153, 155, 202/173, 186; 203/11, 71, 87, 88, DIG. 17
See application file for complete search history.

(56) References Cited

U.S. PATENT DOCUMENTS

| | | | |
|---|---|---|---|
| 2,979,443 A | 4/1961 | Frankel | |
| 2,993,844 A | 7/1961 | Nilan | |
| 3,488,260 A | 1/1970 | Gilbert | |
| 3,503,853 A | 3/1970 | Taubert et al. | |
| 3,855,072 A | 12/1974 | Liu | |
| 4,312,710 A | 1/1982 | Tanaka et al. | |
| 4,332,642 A * | 6/1982 | Cane et al. | 202/173 |
| 4,334,904 A * | 6/1982 | Apothaker et al. | 65/36 |
| 4,334,961 A * | 6/1982 | Moen et al. | 202/173 |
| 4,450,904 A * | 5/1984 | Volz | 165/162 |
| 4,591,413 A * | 5/1986 | Peterson | 202/173 |
| 4,871,014 A * | 10/1989 | Sulzberger | 165/76 |
| 5,268,073 A * | 12/1993 | Casper et al. | 159/47.1 |
| 5,968,312 A * | 10/1999 | Sephton | 159/47.1 |

* cited by examiner

*Primary Examiner*—Virginia Manoharan

(57) ABSTRACT

The present invention provides a multi stage flash long tube evaporator with flash stages arranged in a plurality of at least three tiers, wherein each tier is divided into a plurality of at least two flash stages and a plurality of at least three tube bundles are arranged in parallel and in a longitudinal direction in each tier. This configuration allows to minimize the evaporator shell volume, shell surface, foot print and weight, minimizing the cost of an evaporator and other related plant cost. This configuration is in particular suitable for large evaporator unit capacities.

7 Claims, 15 Drawing Sheets

MULTI-STAGE FLASH EVAPORATOR

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A SEQUENCE LISTING

Not Applicable.

BACKGROUND OF THE INVENTION

A multi-stage flash evaporator is the main component of a seawater desalination plant for producing distilled water from seawater. Most evaporators for large capacity desalination plants are currently of a 'cross tube' type with all flash stages arranged in a single tier configuration, being build with evaporator unit capacities up to about 25 million gallons per day or about 100,000 cubic meters per day of distillate production.

A multi-stage flash evaporator comprises a plurality of flash stages, in existing plants typically between 15 and 30. While a heated solution, typically seawater or brine, enters the first flash stage at its highest temperature, the solution flashes down in each consecutive flash stage to a lower temperature compared to the temperature of the solution in the previous flash stage, releases some vapor which is then condensed on a tube bundle and collected as distillate. The salt concentration of the solution is increasing toward the last flash stage. A coolant enters with its lowest temperature into the tube bundle(s) at the last flash stage and its temperature increases in each flash stage relative to its temperature in the previous flash stage as vapor is condensing on the tube bundles. The coolant discharging from the tube bundle(s) of the first flash stage is further heated in a separate heat exchanger, commonly described as the heat input section or brine heater, by an external heat source to a top temperature. The coolant is than used as the solution, also described as flashing brine, fed into the first flash stage.

A multi-stage flash desalination system may be designed as a "once through" process in which one type of coolant is being conveyed through the tube bundles of all flash stages, starting from the last flash stage with the lowest operation temperature to the first flash stage operating at the highest temperature.

The most common design concept for multi stage flash desalination plants is the "brine re-circulation" system, in which the evaporator comprises a heat recovery section and a heat rejection section. The heat rejection section comprises a plurality of flash stages including the last flash stage, in which typically fresh seawater is used as a first coolant for the tube bundles. The heat rejection section is designed such, that the first coolant is capable, to remove together with the discharging distillate and the discharging concentrated solution, the majority of the heat introduced into the system through the heat input section. In the heat recovery section, which occupies typically the larger number of flash stages of an evaporator including the first flash stage, the heat released from the solution is recovered by a second coolant and used to bring the second coolant toward the desired top temperature. A mixture of a part of the concentrated solution discharging from the last flash stage of the evaporator and a part of the first coolant discharging from the heat rejection section, described mostly as re-circulating brine, is commonly used as the second coolant for the heat recovery section. The portion of the first coolant used as part of the second coolant, replaces primarily the amount of distillate and concentrated solution discharging from the system. It may be treated in order to limit scaling of the tube bundles and to limit corrosion in the evaporator.

Individual types of evaporators may be differentiated by the tube bundle configuration such as 'long tube' evaporators and 'cross tube' evaporators. In a long tube evaporator, the tube bundles are substantially oriented in the flow direction of the solution in the flash stages. A long tube evaporator of the prior art typically comprises a plurality of individual evaporator modules. Each module comprises typically one tube bundle with a tube sheet and a water box on each end. The individual evaporator modules are typically internally divided by stage divider walls into a plurality of flash stages. The tube bundles are also divided by the stage divider walls into a plurality of tube bundle elements, so that each flash stage comprises one tube bundle element, configured to condense the vapor released from the solution in the individual flash stages. The coolant is typically conveyed through the tube bundles of the individual modules of an evaporator unit in serial flow communication. Evaporator modules comprising two tube bundles fed with coolant in parallel have been designed and build as well. Such long tube evaporators have been preferred until about the early 1980's when the maximum evaporator capacities have been in the range of about 30% of current evaporator capacities.

The cross tube evaporator became for larger capacities the preferred and more economical evaporator configuration. In a cross tube evaporator, the tube bundles are oriented substantially transversally to the flow direction of the solution in the flash stages. Cross tube type evaporators typically comprise an individual single pass tube bundle in each flash stage. Evaporator configurations with double pass tube bundles or common tube bundles for a pair of flash stages are also known. The cross tube evaporators have technically only limited possibilities to increase the unit capacities beyond the maximum unit capacities of evaporators currently in operation, mainly due to limitations of available tube length for tube bundles.

Evaporators with large unit capacities are typically designed and build in a single tier configuration, meaning, all flash stages being arranged on the same level. Double tier configurations, with flash stages arranged in two tiers stacked on top of each other, have been designed and build as well. In some cases a common horizontal tier partition has been used between the top and bottom tier, while in other cases two individual evaporator modules, each having its own shell roof and shell bottom structure have been stacked on top of each other.

BRIEF SUMMARY OF THE INVENTION

The main concept of the present invention is a multi stage flash long tube evaporator, comprising a plurality of at least three (3) vertically stacked tiers, each tier comprising a plurality of flash stages and a plurality of at least three (3) parallel arranged tube bundles, each tube bundle being configured to extend in a longitudinal direction through all flash stages of an individual tier. The present invention is aiming to minimize the overall dimensions, foot print, volume and weight of a multi stage flash evaporator, to minimize material quantities required for the manufacturing and the space required in a plant layout. The present invention is aiming in particular to evaporators with medium to large unit capacities in the range from approximately 10 million gallons per day or about 40,000 cubic meters per day to any desired capacity of distillate production, allowing also to be expanded to evaporator unit capacities, significantly larger than the evaporator concepts of prior art.

The configuration of a multi stage flash long tube evaporator of the present invention allows to divide individual tiers into any number of flash stages as technically and economically feasible, without increasing the evaporator size, which is a significant advantage over a 'cross tube' configuration. The increase of number of flash stages leads technically to an increase of the log mean temperature difference on the tube bundles, which in turn allows to reduce the required total tube surface area for a given evaporator capacity and evaporator performance ratio (ratio of mass units of distillate generated per thermal energy unit consumed by a desalination unit, typically in the range of 7-12 lbs/1000 BTU or approximately 3-5 kg/1000 kJ).

The concept of using a plurality of at least three individual tube bundles arranged in parallel in each tier of an evaporator of the present invention, allows to minimize the height of the flash stages compared to an arrangement with only one or two tube bundles traditionally applied to long tube evaporators of the prior art, which leads in combination with the stacked tier configuration to a smaller volume and small foot print of the evaporator compared to a long tube or cross tube configuration of the prior art with medium to large unit capacity.

The width of an evaporator of the present invention is mainly determined by the space required to convey the solution through the flash stages and the area required to release the vapor from the solution, which provides in any case sufficient space to allow the parallel arrangement of a plurality of at least three tube bundles in each individual tier.

The relatively small cross sectional area of the individual tube bundles also allows to maintain relatively low vapor side pressure losses, which is an important factor in regard to the performance of an evaporator and the required total tube surface area.

An additional feature of the multi stage flash long tube evaporator of the present invention is the possibility to produce in an efficient way, beside the distillate which is substantially generated from a first vapor released from the solution, also a high purity distillate from a second vapor released from accumulated distillate. The high purity distillate may be for example used for any type of steam generation system required in conjunction with a seawater desalination plant, saving other means of water purification required to achieve the high purity water quality, typically specified for steam generators.

For a multi stage flash long tube evaporator of the present invention, there is technically no restriction in the possible evaporator unit capacity, since the width of the evaporator and the number of parallel installed tube bundles in individual tiers can be increased to accommodate any distillate production capacity and required solution flow, maintaining a limited allowable liquid loading for the solution (liquid loading=solution mass flow rate per ft or meter width of a flash stage).

The multiple tier configuration allows an easier control of the solution levels in the plurality of flash stages located in an individual tier, due to the static head available for the solution flow, when passing from one tier to the next tier below, which prevents largely any influence on the solution levels in one tier due to level changes in an other tier.

Applying a plurality of at least three tiers for the flash stage arrangement in an evaporator, with common horizontal tier partitions between the individual tiers, reduces the temperature differences and associated thermal stresses in evaporator parts, compared to a double tier configuration.

This brief summary has been provided, so that the nature of the invention may be understood quickly. A more complete understanding of the invention can be obtained by reference to the following detailed description of the preferred embodiments thereof in connection with the attached drawings.

BRIEF DESCRIPTION OF THE SEVERAL VIEWS OF THE DRAWINGS

The present invention will be better understood from the following detailed description of an exemplary embodiment of the present invention, taken in conjunction with the accompanying drawings in which like reference numerals refer to like parts and in which.

For a better understanding of the present invention, the flow of liquids and vapor are shown in individual Figures in form of arrows indicating in individual positions the main flow direction.

DETAILED DESCRIPTION OF THE INVENTION

Figure 1:
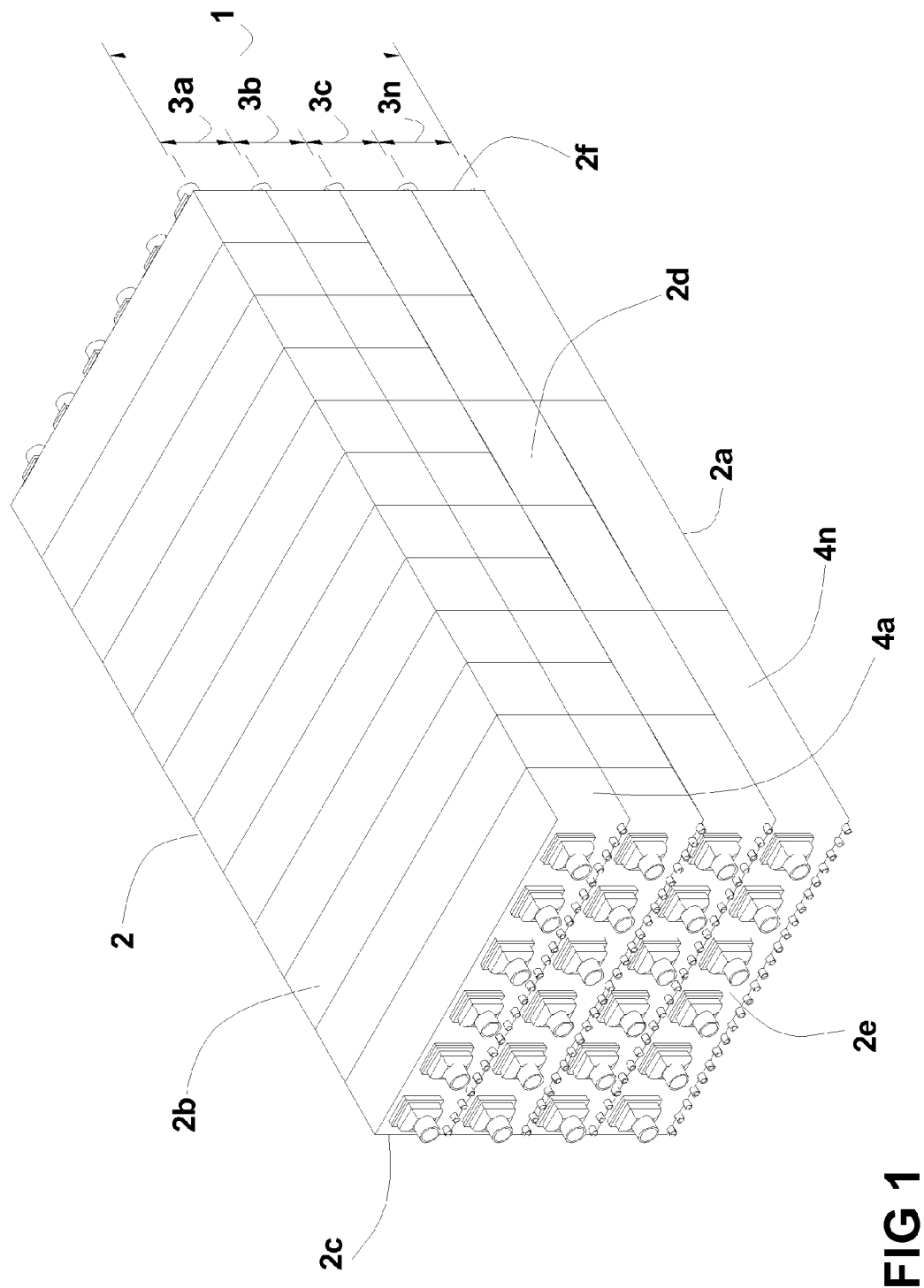
FIG. 1 shows an example of the multi stage flash long tube evaporator comprising of 4 tiers stacked vertically and each tier comprising 6 tube bundles arranged in parallel.
Figure 2:
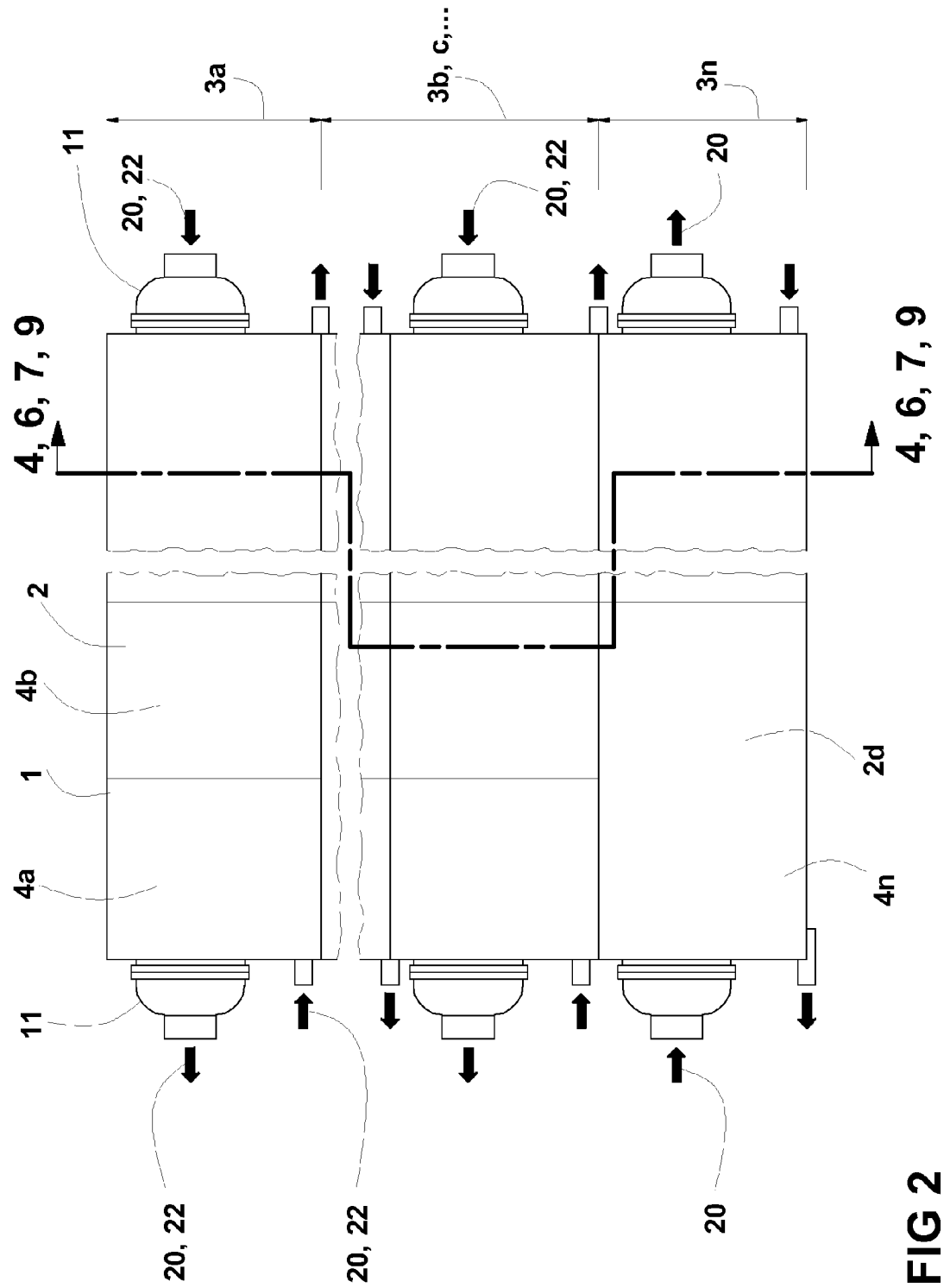
FIG. 2 shows a right side view of the multi stage flash long tube evaporator with a plurality of at least 3 tiers stacked vertically.
Figure 3:
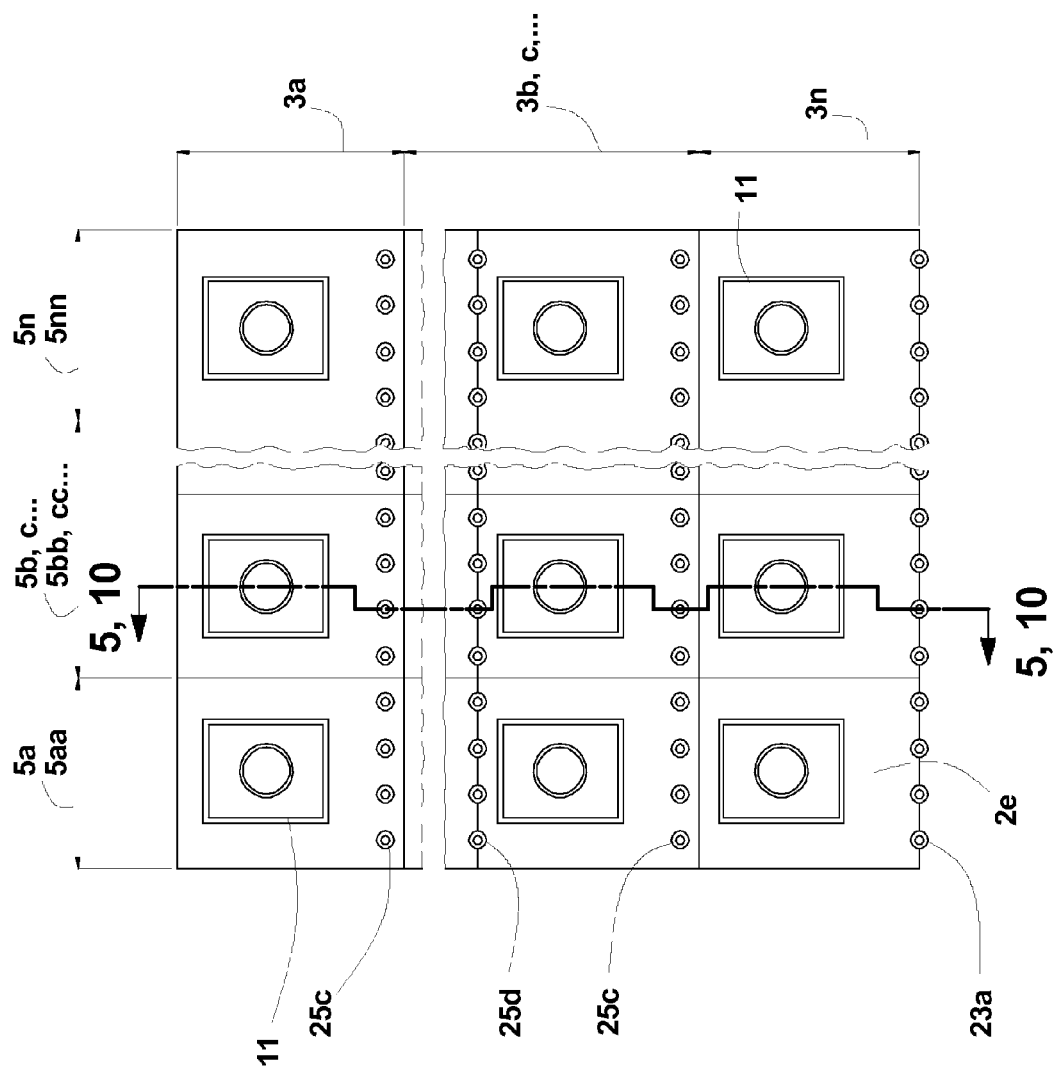
FIG. 3 shows a front view of the multi stage flash long tube evaporator with a plurality of at least 3 tiers stacked vertically.
Figure 4:
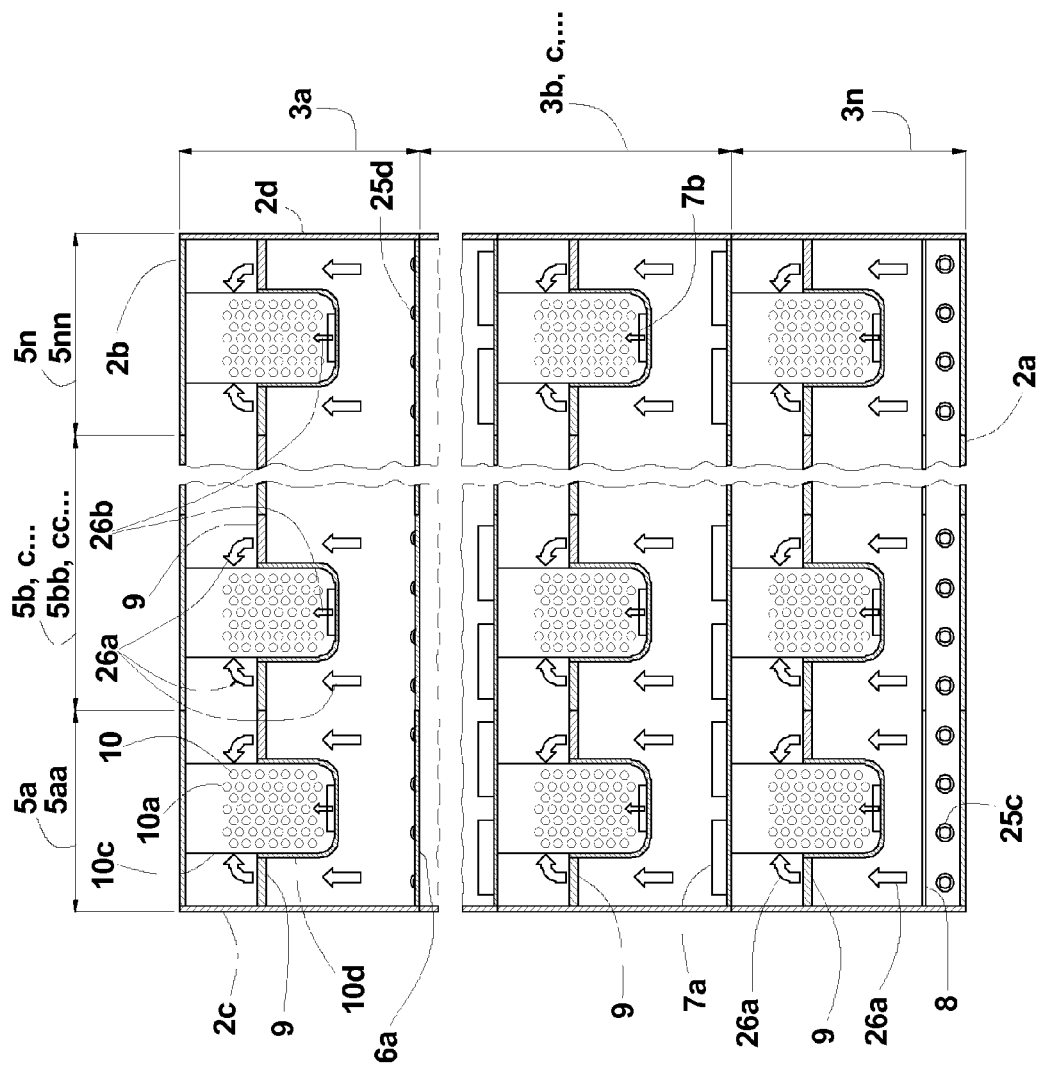
FIG. 4 shows a cross section of the multi stage flash long tube evaporator, taken along the lines 4-4 as indicated in FIG. 2, showing a plurality of flash stage elements, respectively flash stage element rows in each tier, with one tube bundle located in each of the flash stage element rows.

An example of a multi stage flash long tube evaporator 1 of the present invention is shown in FIG. 1. Details are shown in a right side view FIG. 2, a front view FIG. 3, a cross section FIG. 4 and a longitudinal section FIG. 5. The evaporator 1 comprises a shell 2 with a shell bottom 2a, a shell roof 2b, a left side wall 2c, a right side wall 2d, a front wall 2e and an end wall 2f. The shell 2 is internally divided by a plurality of horizontal tier partitions 6a into a plurality of tiers, with a top tier 3a, at least one intermediate tier 3b or further intermediate tiers 3c . . . and a bottom tier 3n. The horizontal tier partitions 6a are extending substantially in a longitudinal direction of the evaporator 1 from the front wall 2e to the end wall 2f and in a transversal direction from the left side wall 2c to the right side wall 2d. The individual tiers 3a, 3b . . . , 3n are divided by a plurality of flash stage partition walls 6c into a plurality of flash stages, with a first flash stage 4a located in the top tier 3a next to the front wall 2e, a plurality of intermediate flash stages 4b, 4c . . . , and a last flash stage 4n located in the bottom tier 3n. The flash stage partition walls 6c are arranged substantially vertically and in parallel to the front wall 2e and end wall 2f, extending from the left side wall 2c to the right side wall 2d. In the top tier 3a the flash stage partition walls 6c extend from the horizontal tier partition 6a which is separating the top tier 3a from the first intermediate tier 3b to the evaporator roof 2b. In the intermediate tiers, the flash stage partition walls 6c extend in between the horizontal tier partitions 6a, separating the individual tier 3b or 3c . . . from the other tiers located directly below and above, while they extend in the bottom tier 3n from the shell bottom 2a to the horizontal tier partition 6a located directly above the bottom tier 3n.

Each of the flash stages 4a, 4b, 4c . . . to 4n are comprising in a transversal direction between the left side wall 2c and the right side wall 2d a plurality of at least three flash stage elements, with a left flash stage element 5a located next to the left side wall 2c, at least one intermediate flash stage element 5b, or further intermediate flash stage elements 5c . . . and a right flash stage element 5n located next to the right side wall 2d, wherein all flash stages located in the same tier, comprise the same number of flash stage elements.

The individual flash stage elements 5a, 5b, 5c . . . , 5n of all flash stages located in an individual tier are forming in longitudinal direction in between the front wall 2e and the end wall 2f rows of flash stage elements, with a left row of flash stage elements 5aa, at least one intermediate row of flash stage elements 5bb, or further intermediate rows of flash stage elements 5cc . . . , and a right row of flash stage elements 5nn. Each row of flash stage elements 5aa, 5bb . . . , 5nn, comprises one of a plurality of tube bundles 10, each tube bundle 10 extends in the longitudinal direction substantially from the front wall 2e to the end wall 2f. Each tube bundle 10 is divided by the flash stage partition walls 6c into a plurality of tube bundle elements 10f, so that each of the flash stage elements 5a to 5n in each of the flash stages 4a to 4n comprises one tube bundle element 10f. Each tube bundle 10 comprises a plurality of straight tubes 10a arranged substantially horizontally and in longitudinal direction, tube sheets 10b, one of each installed on or near to the front wall 2e and end wall 2f and, if required, a plurality of tube support plates 10c, installed in between the tube sheets 10b and the flash stage partition walls 6c located next to the tube sheets 10b, or in between the individual flash stage partition walls 6c. The flash stage partition walls 6c, the tube sheets 10b and the tube support plates 10c have tube holes arranged in the same pattern, to allow the installation of the straight tubes 10a.

A pair of water boxes 11 are installed on each of the single pass tube bundles 10, to feed a first coolant 20 or a second coolant 22 into each single pass tube bundle 10 and to collect the first coolant 20 or second coolant 22 discharging from each of the tube bundles 10.

Figure 5:
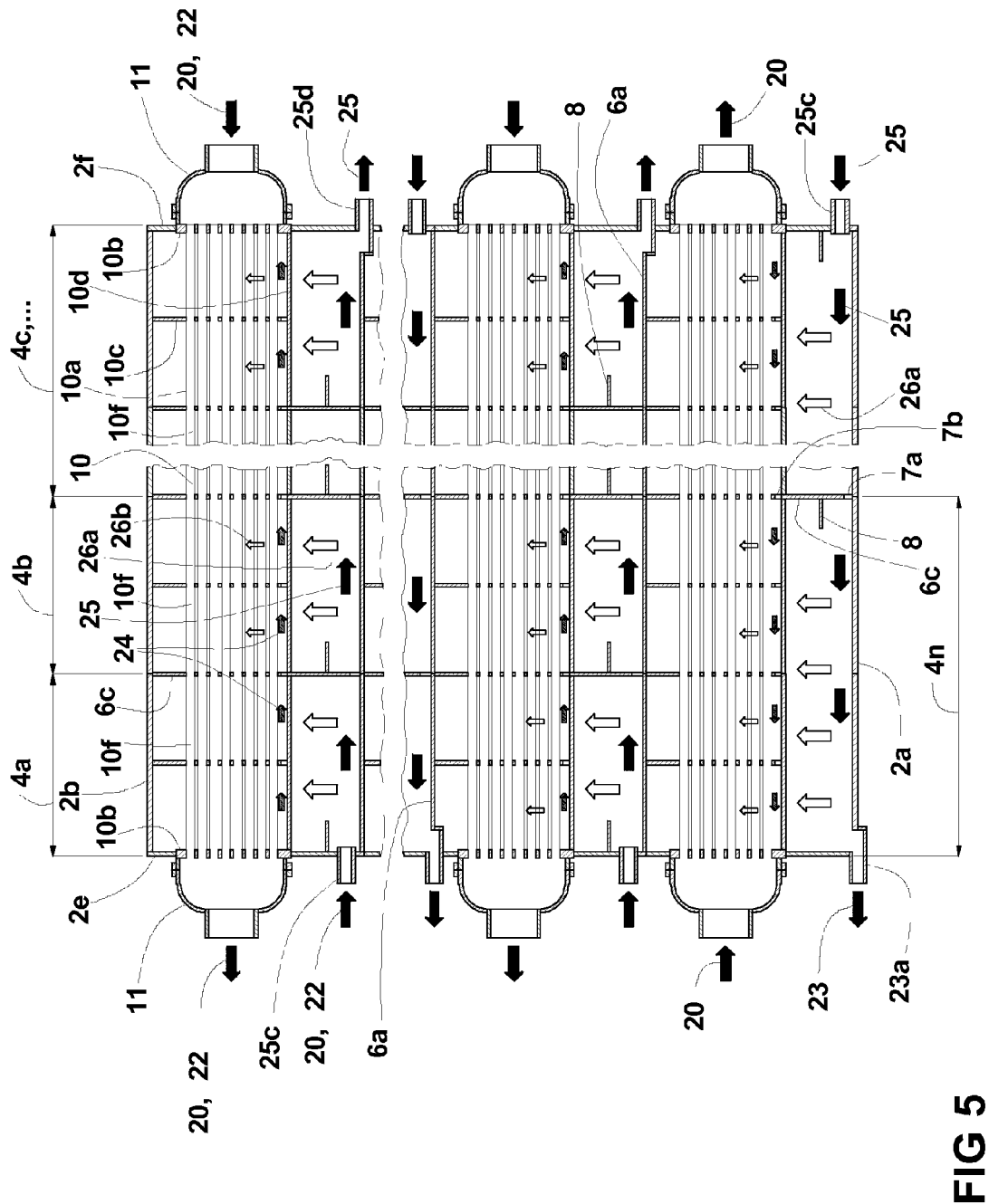
FIG. 5 shows a longitudinal section of the multi stage flash long tube evaporator, taken along lines 5-5 as indicated in FIG. 3, showing in each tier a tube bundle extending in a longitudinal direction substantially through all the flash stages of the individual tiers.

The evaporator 1 and the associated parts of the evaporator 1 are configured to convey a solution 25 from the first flash stage 4a through all flash stages in serial flow communication, to allow the solution 25 to flash down in each flash stage 4a to 4n to a temperature lower than the temperature of the solution 25 in the previous flash stage, to allow the solution 25 to release a first vapor 26a in each flash stage 4a to 4n, to condense the first vapor 26a on the tube bundle elements 10f, located in the individual flash stages and to collect the condensed first vapor 26a as distillate 24, to convey the solution 25 in the flash stages located in the top tier 3a into a first flow direction from the first flash stage 4a toward the end wall 2f, to convey the solution 25 either in at least one of the intermediate tiers 3b, 3c . . . or in the bottom tier 3n in a flow direction opposite to the flow direction of the solution 25 in the tier located directly above the at least one tier as illustrated in FIG. 5, or to convey the solution 25 in all of the intermediate tiers 3b, 3c . . . and in the bottom tier 3n in the same flow direction as the solution 25 in the top tier 3a, to convey the first coolant 20 and the second coolant 22 in the plurality of tube bundles 10 located in an individual tier 3a, 3b, . . . 3n in parallel and in a flow direction opposite to the flow direction of the solution 25 in the same tier, to accumulate and convey the distillate 24 through all flash stages in the same flow direction as the solution 25, to allow the accumulated distillate 24 to flash down in the flash stages 4b to 4n to a temperature lower than the temperature of the distillate 24 in the previous flash stage, to allow the accumulated distillate 24 to release a second vapor 26b in each of the flash stages 4b to 4n, and to condense the second vapor 26b on the tube bundle elements 10f, located in the individual flash stages.

Mist eliminators 9 may be installed in the individual flash stages such, that the first vapor 26a released from the solution 25 is passing through the mist eliminators 9 before entering into and condensing on the tube bundles 10, so that salt water droplets carried in the vapor 26a are largely eliminated, to achieve a desired distillate purity.

A plurality of solution orifices 7a are located in the flash stage partition walls 6c. The solution orifices 7a are arranged over the width of the partition walls 6c between the left side wall 2c and the right side wall 2d and are sized such, that the solution 25 can pass through, from one flash stage to the next flash stage, driven by a differential pressure between two flash stages, while maintaining a level of the solution 25 above the solution orifice 7a, so that no first vapor 26a would pass through the solution orifice 7a. The differential pressure between the flash stages is maintained by the flash down of the solution 25 in each flash stage and the resulting temperatures of the first vapor 26a and corresponding saturation pressure in each flash stage.

Splash hoods 8 or similar devices may be installed downstream of the solution orifices 7a.

Tube bundle shrouds 10d as shown in FIGS. 4, 5, 6, 7, 8 and 10 are formed around the lower part of the tube bundle elements 10f, to guide the first vapor 26a released from the solution 25 through the mist eliminators 9 before entering into the tube bundle elements 10f. The tube bundle shrouds 10d serve also to accumulate the distillate 24 from the condensing first vapor 26a and second vapor 26b and may serve also to convey the accumulated distillate 24 through the flash stages. For this purpose distillate orifices 7b may be cut into the flash stage partition walls 6c, allowing the distillate to pass from one flash stage to the next.

Figure 6:
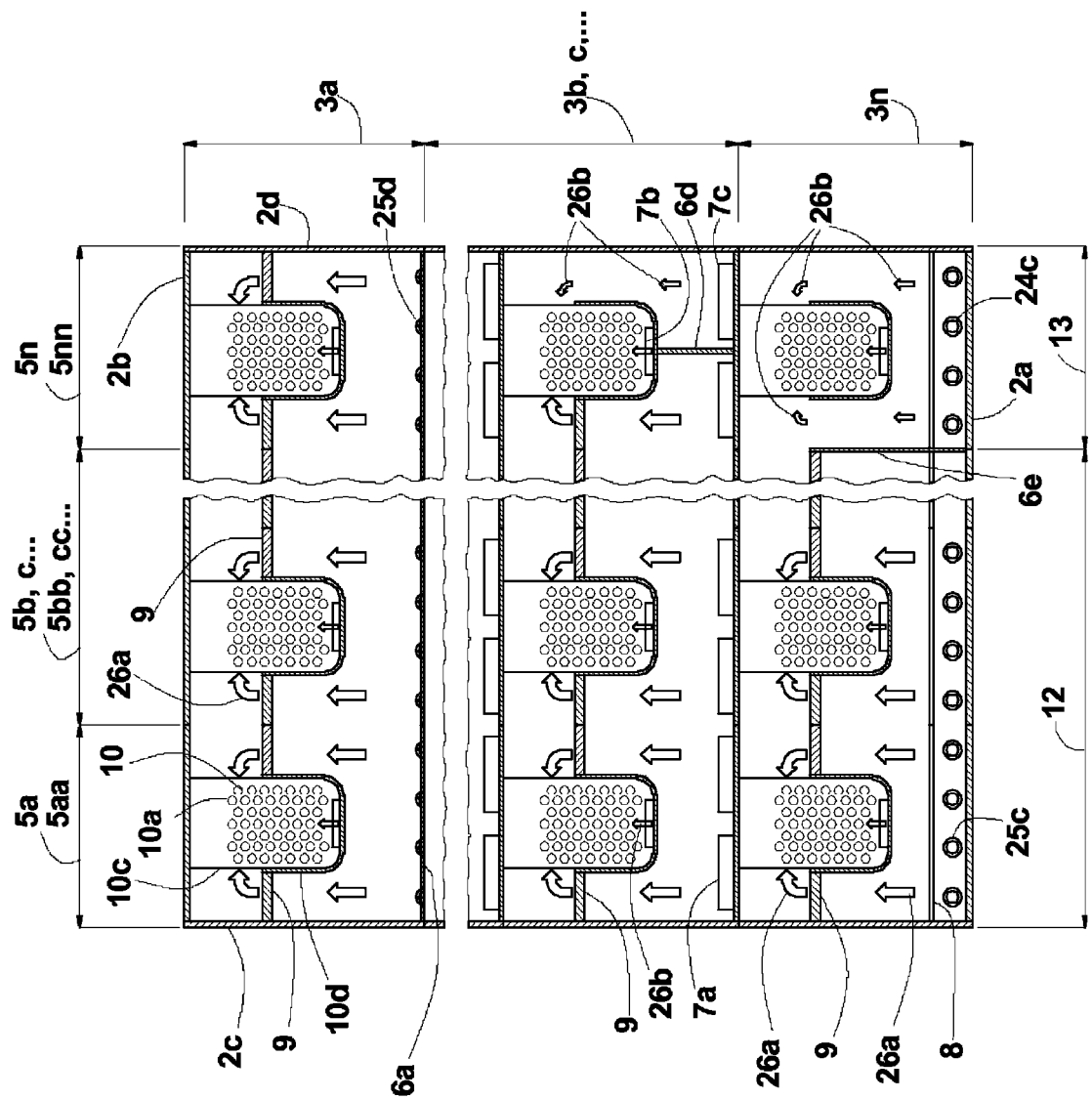
FIG. 6 shows a cross section of the multi stage flash long tube evaporator, taken along lines 6-6 as indicated in FIG. 2, with a first and second type of a longitudinal partition wall dividing the flash stages of individual tiers into a first and second flash stage part, configured to allow accumulated distillate to flow in parallel to the solution on top of the horizontal tier partitions or shell bottom.

For the purpose to accumulate and convey the distillate 24 in the bottom tier 3n on top of the shell bottom 2a or in the other tiers on top of a horizontal tier partition 6a in parallel to the solution 25, a first type of longitudinal partition wall 6d as shown for example in an intermediate tier in FIG. 6 or a second type of longitudinal partition wall 6e as shown for example in the bottom tier 3n in FIG. 6 may be installed in at least one tier. The longitudinal partition walls 6d and 6e would extend in longitudinal direction substantially from the front wall 2e to the end wall 2f. The first type of longitudinal partition wall 6d would be arranged vertically between the shell bottom 2a or a horizontal tier partition 6a and the tube bundle shrouds 10d of a tube bundle 10 located directly above, while the second type of longitudinal partition wall 6e would be arranged on top of the shell bottom 2a or on top of a horizontal tier partition 6a and in between two tube bundles 10. Both types of longitudinal partition walls 6d and 6e would divide each of the flash stages located in the at least one tier into a first flash stage part 12 and a second flash stage part 13. The at least one tier together with the first type of longitudinal partition wall 6d or second type of longitudinal partition wall 6e, would be configured to convey the solution 25 on top of the shell bottom 2a or on top of a horizontal tier partition 6a in the first flash stage parts 12 through the flash stages, and to accumulate and convey at least a part of the distillate 24 in the second flash stage parts 13 also on top of the shell bottom 2a or on top of a horizontal tier partition 6a. The width of the first flash stage parts 12 and second flash stage parts 13 in an individual tier would be approximately proportional to the flow rates of the solution 25 and the accumulated distillate 24 conveyed through the individual flash stage parts 12 and 13 and may therefore change, in the individual tiers as the amount of accumulated distillate 24 is increasing, while the amount of solution 25 is decreasing toward the last flash stage 4n. The second vapor 26b released from the accumulated distillate 24 has a higher purity compared to the first vapor 26a released from the solution 25 and would therefore enter into the tube bundle(s) 10 without passing through a mist eliminator 9, as shown in FIG. 6. With the arrangement of the longitudinal partitions 6d and 6e, the first vapor 26a released from the solution 25 in the first flash stage parts 12 and the second vapor 26b released from the accumulated distillate 24 in the second flash stage parts 13 may partly mix.

In place of the solution orifices 7a, distillate orifices 7c would be cut in the flash stage partition walls 6c in the second flash stage parts 13, allowing the accumulated distillate 24 to pass from one flash stage to the next.

Figure 7:
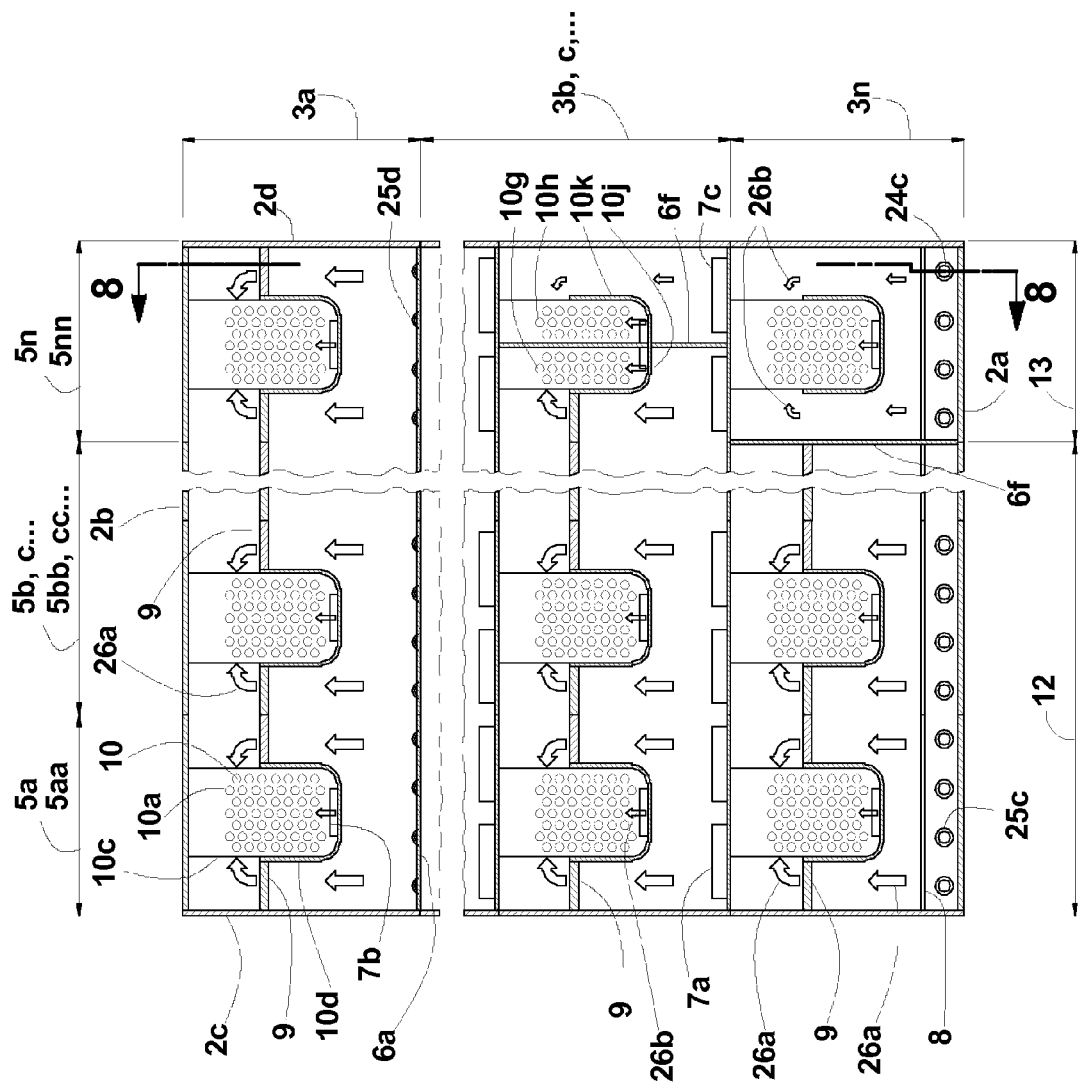
FIG. 7 shows a cross section of the multi stage flash long tube evaporator, taken along the lines 7-7 as indicated in FIG. 2, with a third type of longitudinal partition walls dividing the flash stages in individual tiers into a first and second flash stage part, configured to allow accumulated distillate to flow in parallel to the solution on top of the horizontal tier partitions or shell bottom, and to collect a high purity distillate from a condensing second vapor in the second flash stage parts.
Figure 8:
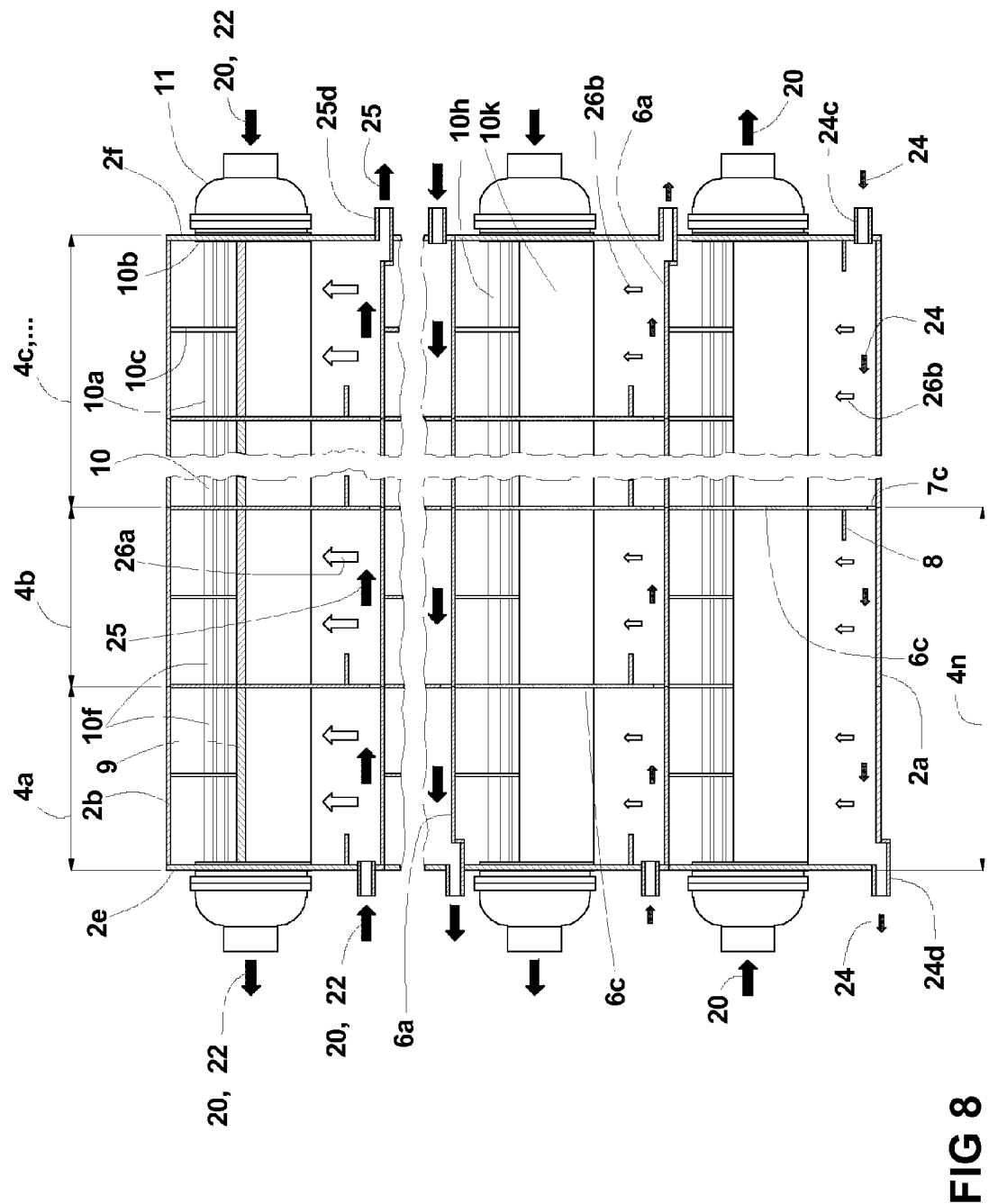
FIG. 8 shows a longitudinal section of the multi stage flash long tube evaporator, taken along the lines 8-8 as indicated in FIG. 7, showing in the top tier the solution and the first vapor released from the solution, while showing in the bottom tier and the intermediate tier located directly above, the accumulated distillate and the second vapor released from the accumulated distillate in the second flash stage parts.

Installing a third type of a longitudinal partition wall 6f as shown for example in FIG. 7 in the lower tier 3n and in the intermediate tier above, in at least one tier, would also divide each of the flash stages in the at least one tier into a first flash stage part 12 and a second flash stage part 13. The at least one tier together with the third type of longitudinal partition wall 6f would be also configured such, that the solution 25 would be conveyed in the first flash stage parts 12 and at least a part of the distillate 24 would be accumulated and conveyed in the second flash stage part 13. The third type of longitudinal partition wall 6f would be either located in a first position in between two tube bundles 10 or in a second position, dividing each of the tube bundle elements 10f of one of the plurality of tube bundles 10 located in the at least one tier into a first part of a tube bundle element 10g and a second part of a tube bundle element 10h, and the associated tube bundle shrouds 10d into a first part of a tube bundle shroud 10j and a second part of a tube bundle shroud 10k. Depending on the position of the third longitudinal partition wall 6f, the second flash stage parts 13 would comprise at least a second part of a tube bundle element 10h with a second part of a tube bundle shroud 10k, or at least one tube bundle element 10f together with one tube bundle shroud 10d, while the remaining tube bundle elements 10f and associated tube bundle shrouds 10d and the first parts of tube bundle elements 10g and first parts of a tube bundle shrouds 10j would be located in the first flash stage parts 12. The first vapor 26a released from the solution 25 in a first flash stage part 12 as well as the second vapor 26b released from distillate 24 in a first flash stage part 12 would condense only on the tube bundle elements 10f or on a first part of a tube bundle element 10g located in the first flash stage part 12, while the second vapor 26b released from the accumulated distillate 24 in the second flash stage parts 13, would condense only on the tube bundle elements 10f or second parts of tube bundle elements 10h located in the second flash stage parts 13. The distillate generated from the condensing second vapor 26b released from the accumulated distillate 24 in the second flash stage parts 13 would be collected as a high purity distillate 24x in the tube bundle shrouds 10d or second parts of tube bundle shrouds 10k located in the second flash stage parts 13.

Figure 9:
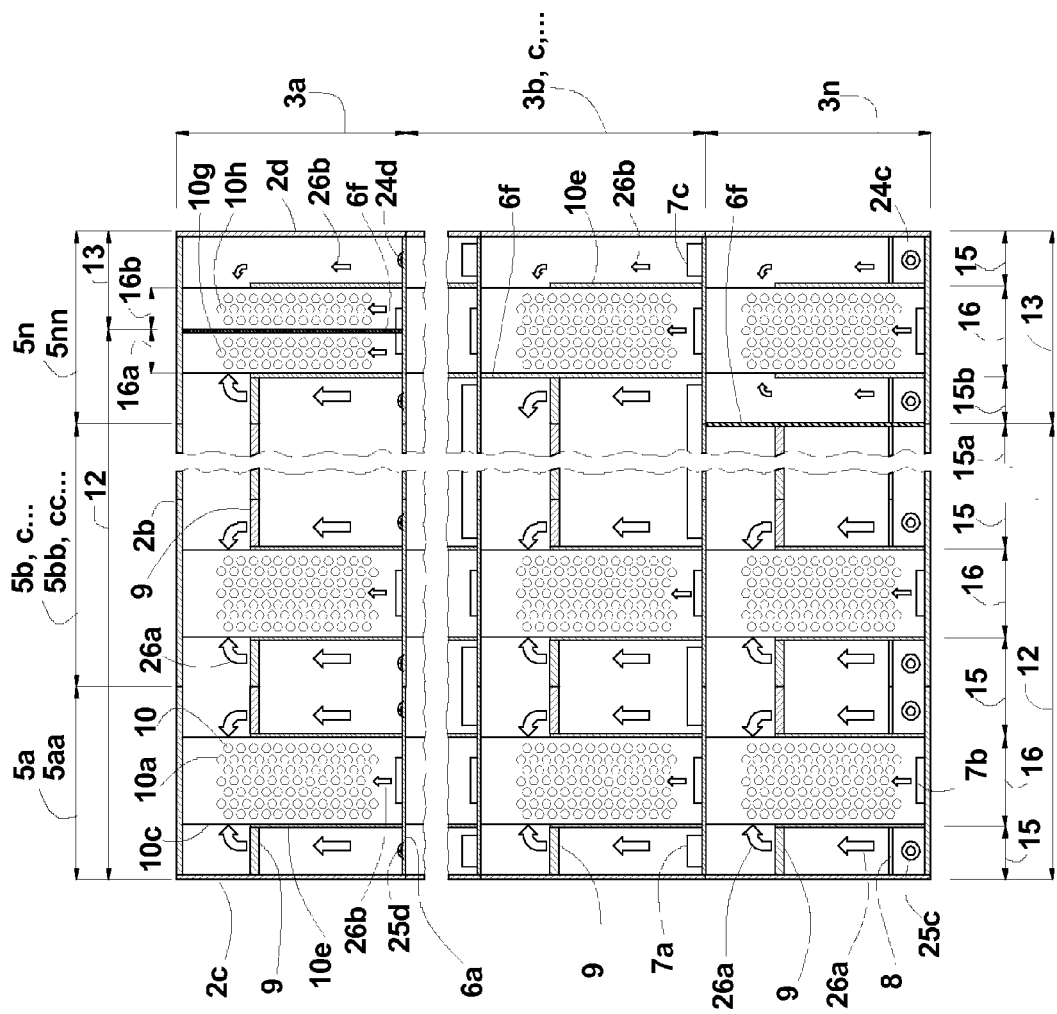
FIG. 9 shows a cross section along the lines 9-9 as indicated in FIG. 2, showing in place of the tube bundle shrouds, longitudinal tube bundle walls, configured to create a plurality of first channels in between the tube bundles or between a tube bundle and the left side wall or right side wall, and a plurality of second channels, one of each located below each tube bundle and showing further a third type of longitudinal partition walls in the individual tiers in different positions.

In place of the tube bundle shrouds 10d shown in the FIG. 4 to 8 and FIG. 10, a plurality of tube bundle walls 10e may be installed in at least one tier as shown for example in FIG. 9. The tube bundle walls 10e are extending substantially from the front wall 2e to the end wall 2f and in the bottom tier from the shell bottom 2a, respectively in the other tiers from a horizontal tier partition 6a, upwards, forming in the bottom tier 3n together with the shell bottom 2a or in one of the other tiers together with one of the horizontal tier partition 6a a plurality of first channels 15, one of each located in between two tube bundles 10 and in between two tube bundle walls 10e, or between a tube bundle 10 and the left side wall 2c or the right side wall 2d limited by a tube bundle wall 10e and the left side wall 2c or the right side wall 2d, and forming further a plurality of second channels 16, one below each of the plurality of tube bundles 10 of the at least one tier, in between two tube bundle walls 10e or in between the left side wall 2c or right side wall 2d and a tube bundle wall 10e, in case no first channel 15 is formed next to the right side wall 2c or left side wall 2d. The at least one tier together with the tube bundle walls 10e would be configured such, that the solution 25 would be conveyed through the flash stages in the first channels 15, while the distillate 24 would be accumulated and conveyed in the second channels 16.

A third type of a longitudinal partition wall 6f could be installed in at least one tier in a first position in between two tube bundles 10 as shown for example in the bottom tier 3n of FIG. 9, dividing one of the first channels 15 into a first part of a first channel 15a and a second part of a first channel 15b. Alternatively one of the third type of longitudinal partition walls 6f could be located in a second position as shown for example in FIG. 9 in the top tier 3a such, that each tube bundle element 10f of one of the plurality of tube bundles 10 located in the at least one tier is divided into a first part of a tube bundle element 10g and a second part of a tube bundle element 10h, while the second channel 16 directly below the same tube bundle 10 would be divided into a first part of a second channel 16a and a second part of a second channel 16b. Furthermore one of the third type of longitudinal partition walls 6f could be installed in a third position as shown for example in FIG. 9 in an intermediate tier, replacing one of the tube bundle walls 10e. In all the three positions the flash stages of the at least one tier, would be divided by the third type of longitudinal partition wall 6f into a first flash stage part 12 and a second flash stage part 13. The second channels 16 or second part of a second channel 16b located in the second flash stage parts 13 of the flash stages located in the at least one tier, would be configured, to accumulate and convey the high purity distillate 24x generated from the condensing second vapor 26b, released from the distillate 24 in the second flash stage parts 13, while the first channel(s) 15 or second part of a first channel 15b located in the second flash stage parts 13 would be configured to accumulate and convey distillate 24, while some of the distillate 24 may be conveyed also in the second channels 16 or the first part of a second channel 16a located in the first flash stage parts 12. The first channels 15 or first part of a first channel 15a located in the first flash stage parts 12 would be configured to convey the solution 25.

Installing in at least one tier in place of the third type of longitudinal partition wall 6f as shown for example in the bottom tier 3n of FIG. 9 in a first position, or in place of the third type of longitudinal partition walls 6f as shown for example in an intermediate tier in FIG. 9 in a third position, a second type of longitudinal partition wall 6e as shown for example in FIG. 6 in the bottom tier, would also divide the flash stages of the at least one tier, into a first flash stage part 12 and a second flash stage part 13 and would divide in the first position also one of the first channels 15 into a first part of a first channel 15a and a second part of a first channel 15b. In this case also a part of the first vapor 26a released in the first flash stage parts 12 may condense on the tube bundle elements 10f located in the second flash stage parts 13. Main purpose of the installation of the second type of longitudinal partition wall 6e would be to configure the first channel(s) 15 or second part of a first channel 15b located in the second flash stage parts 13 to accumulate and convey distillate 24.

A configuration of the flash stages where the tube bundle walls 10e, are arranged only on some of the plurality of tube bundles 10 in the at least one tier, while tube bundle shrouds 10d would be arranged at the remaining tube bundles 10, would be possible as well.

Figure 10:
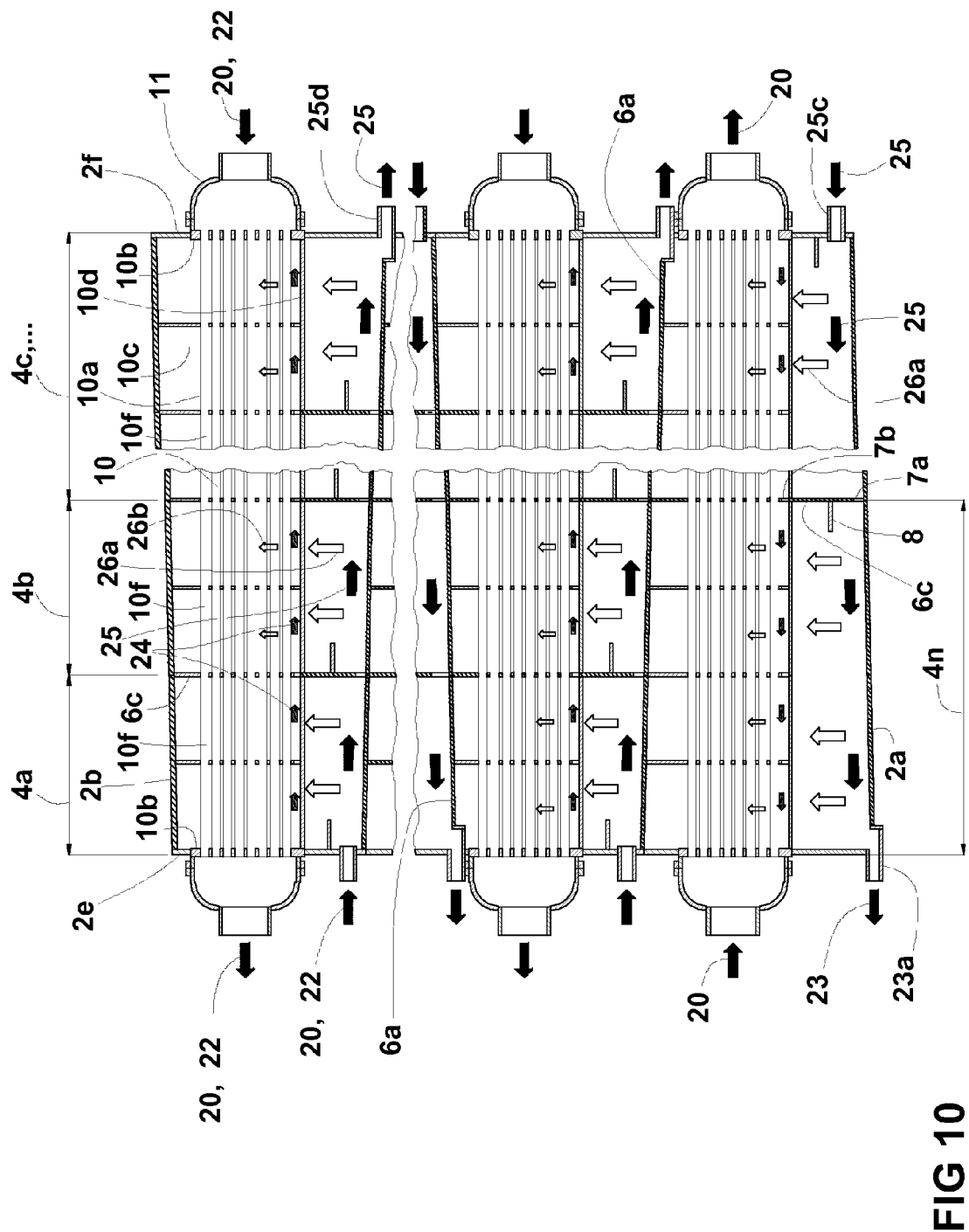
FIG. 10 shows a longitudinal section of the multi stage flash long tube evaporator, taken along lines 10-10 as indicated in FIG. 3, with horizontal tier partitions and shell bottom having a slope in flow direction of the solution flowing on top of the individual horizontal tier partition or on top of the shell bottom.

The evaporator shell bottom 2a and horizontal tier partitions 6a may be arranged with a slope in the flow direction of the solution 25 conveyed on top, as shown for example in FIG. 10. Considering in particular that theoretically flat horizontal tier partitions 6a and the shell bottom 2a are typically warped to a certain degree, the slope would minimize the deposition of suspended solids contained in the solution and ensures a better drainage of the flash stages. Related possible corrosion problems of the horizontal tier partitions 6a and shell bottom 2a would be largely eliminated.

Another advantage of the sloped tier partitions 6a or sloped shell bottom 2a is, that a static head is added to the differential pressure between flash stages. This may help in particular toward the last flash stage 4n respectively in the lower tiers in an evaporator, where the differential pressure between the vapor 26a of two flash stages is significantly lower compared to the differential pressure between flash stages in the top tier 3a, so that the sloped tier partitions 6a and sloped shell bottom 2a would also support the transport of the solution 25 during operation.

The shell roof 2b may be arranged with a slope as well, to allow the drainage of any moisture or other liquids collected on the outer surface, which cold in particular in coastal areas, where desalination plants are primarily installed, help to prevent excessive corrosion of the outer surface of the evaporator shell 2.

In case the evaporator 1 is configured to convey the solution 25 in all tiers into the same flow direction the manufacturing of the evaporator 1 could be carried out with all parts in plumb position, while it could be installed in final position on site in an off plumb position, to provide a positive slope of the evaporator bottom 2a and the horizontal tier partitions 6a in the flow direction of the solution 25. In this case also other parts like the tube bundles 10 would have a slope allowing a better drainage during a plant shut down. A uniform flow direction of the solution 25 in all tiers would however require to make provisions to transport the solution 25 discharging from one tier on the end wall side of the evaporator, to the front wall side of the evaporator to enter into the next tier below.

Figure 11:
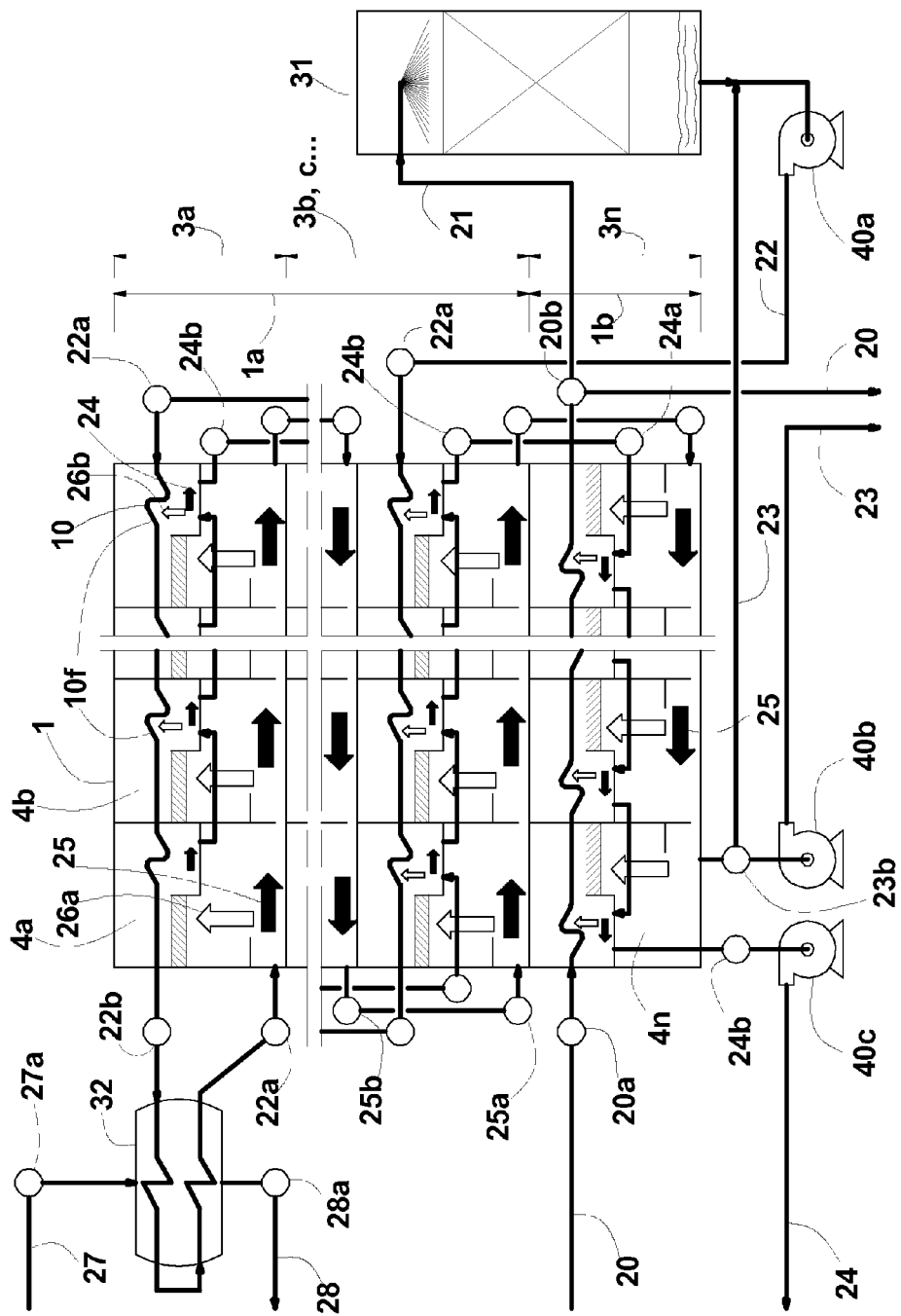
FIG. 11 shows a simplified flow schematic of a desalination unit based on the 'brine recirculation' concept with the multi stage flash long tube evaporator.
Figure 12:
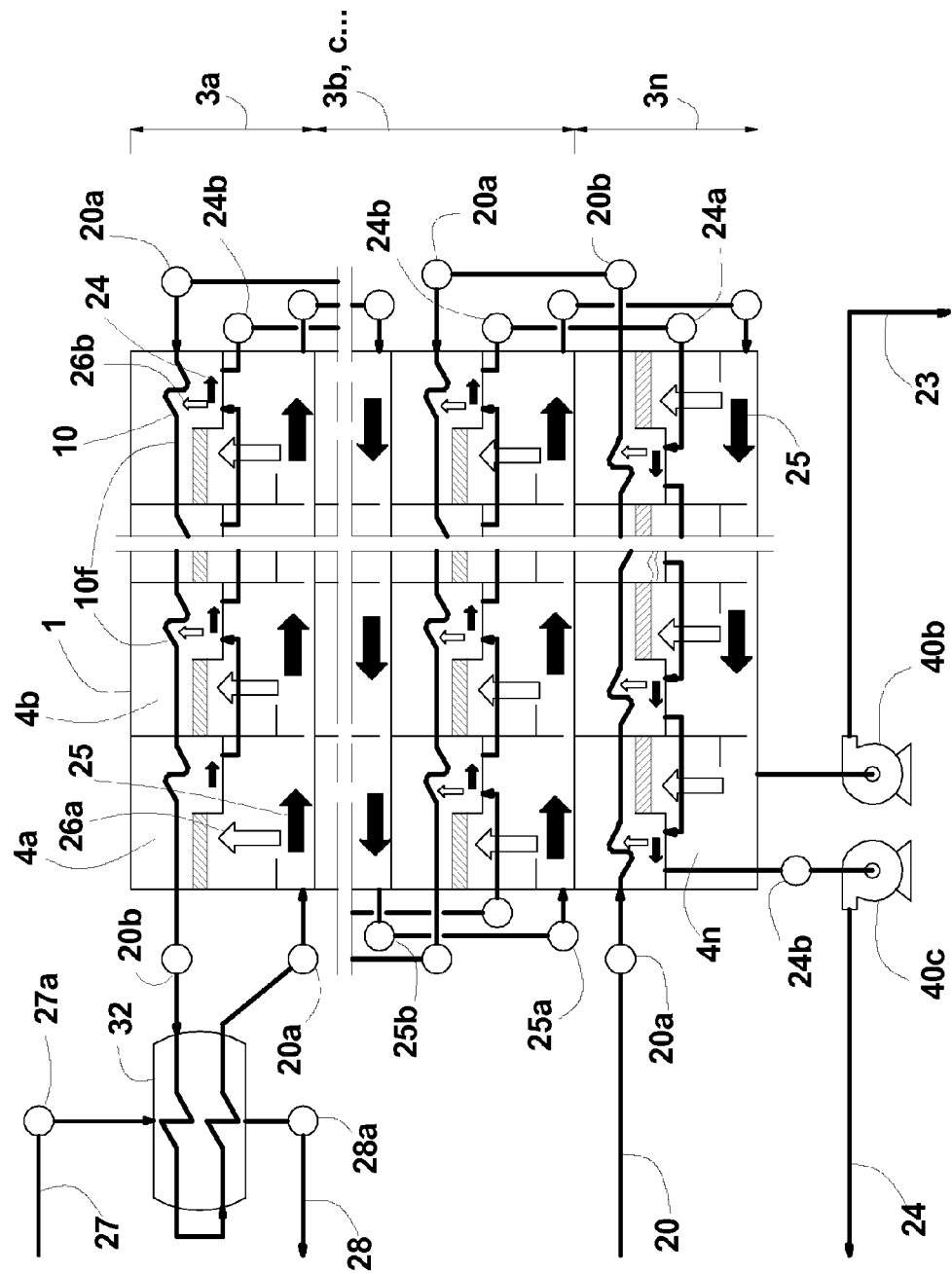
FIG. 12 shows a simplified flow schematic of a desalination unit based on the 'once through' concept with the multi stage flash long tube evaporator.

A multi stage flash long tube evaporator 1 may be used for a seawater desalination plant based on a 'brine recirculation' configuration as shown in a simplified schematic in FIG. 11 or for a desalination plant based on a 'once through' configuration as shown in a simplified schematic in FIG. 12. Both schematics show in the individual tiers 3a, 3b, 3c . . . to 3n only one of the plurality of flash stage element rows 5aa, 5bb, . . . 5nn and only one of the plurality of tube bundles 10 arranged in each of the tiers. The schematics correspond basically with the evaporator configuration illustrated in the FIGS. 4 and 5.

In the case of the brine recirculation system, the multi stage flash long tube evaporator 1 comprises a heat recovery section 1a and a heat rejection section 1b, wherein the heat recovery section 1a comprises the top tier 3a and at least one intermediate tier 3b, or further intermediate tiers 3c . . . , while the heat rejection section 1b comprises at least the bottom tier 3n and may comprise in addition one or more intermediate tiers located directly above the bottom tier 3n.

In the brine recirculation system, the evaporator 1 and its parts are configured to receive a first coolant 20 at the tube bundle elements 10f located in the last flash stage 4n, to convey the first coolant 20 through all tube bundles 10 located in the bottom tier 3n in parallel and in case the heat rejection section comprises more than one tier, to convey the first coolant 20 discharging from the plurality of tube bundles 10 of one tier to the plurality of tube bundles 10 of a tier of the heat rejection section located directly above, in serial flow communication. The same evaporator is further configured to receive a second coolant 22 at the plurality of tube bundles 10 located in the tier directly above the heat rejection section 1b, to convey the second coolant 22 in parallel through the plurality of tube bundles 10 located in an individual tier of the heat recovery section 1a, to convey the second coolant 22 discharging from the tube bundles 10 located in an individual tier to the tube bundles 10 located in a tier directly above in serial flow communication.

For the first coolant 20, typically a filtered seawater is used. For the second coolant 22, pumped by one or more brine recycle pumps 40a through the tube bundles 10 of the heat recovery section 1a, typically a mixture of a concentrated solution 23 discharging from the last flash stage 4n and a make up water 21 branched off from the first coolant 20 discharging from the heat rejection section 1b is used. This mixture, used as second coolant 22, is typically described as re-circulating brine. The make up water 21 may be passed through a deaerator 31, which is operating under a vacuum pressure similar to the pressure of the last flash stage 4n. The deaerator 31 has the purpose to remove the major part of dissolved gases from the make up water 21, to minimize corrosion of the internal surface of the evaporator 1. Furthermore, chemicals may be added into the make up water 21 to minimize scaling of the tube bundles 10. In some cases the flow rate of make up water 21 may be equal to the flow rate of the first coolant 20, which would mean that all of the first coolant 20 discharging from the heat rejection section 1b, would be used as make up water 21 and no first coolant 20 would discharge from the system directly. In some cases no concentrated solution 23 may be added to the make up water 21, so that the coolant 22 would comprise substantially of make up water 21.

As the second coolant 22 flows through the tube bundles 10 of the individual tiers of the heat recovery section 1a, its temperature is gradually increasing, as the first vapor 26a and second vapor 26b is condensing on the tubes bundles 10, and heat is transferred into the second coolant 22. As the second coolant 22 is discharging from the plurality of tube bundles 10 at the first flash stage 4a, it passes then through an external heat exchanger, commonly described as heat input section or brine heater 32, where it is heated to a top temperature by heating steam 27, which is typically a low pressure steam supplied from a power plant. The condensate 28 collected from the condensing heating steam 27 in the brine heater 32 is normally returned to the power plant and reused as boiler feed water.

Similar to the arrangement of the plurality of tube bundles 10 in the individual tiers 3a, b, . . . 3n, also a plurality of brine heaters 32 may be installed, while the plant design with one single brine heater or any other number of parallel installed brine heaters would be possible as well. Coolant outlet headers 22b, as indicated in FIG. 11 may be installed to allow a fluid communication between the second coolant 22 discharging from the plurality of tube bundles 10 of the top tier 3a and any number of brine heaters 32. If required for the supply of the heating steam 27 to the brine heater(s), a steam inlet header 27a may be installed. Similarly, a condensate outlet header 28a may be installed to collect the condensate 28 from a plurality of brine heaters 32. Furthermore a coolant inlet header 22a may be installed for the distribution of the second coolant 22 when entering into the first flash stage 4a.

As the second coolant 22 enters at its top temperature into the first flash stage 4a it becomes a flashing brine or in general terms a solution 25, which flashes down, its temperature drops and some first vapor 26a is released. As the solution 25 is conveyed through the individual flash stages 4a, 4b . . . of the heat recovery section 1a, the flash down of the solution 25, the release of the first vapor 26a, the condensation of the first vapor 26a and heat transfer into the second coolant 22 is repeated in each flash stage. The same procedure is continued as the solution 25 enters into the flash stages of the heat rejection section 1b, wherein here the heat from the condensing first vapor 26a is transferred into the first coolant 20. As the first vapor 26a is continuously released from the solution 25, the concentration of the solution 25 is increasing. When the solution 25 has reached the highest concentration in the last flash stage 4n, it is discharged as concentrated solution 23, also typically described as concentrated brine. While one part of the concentrated solution 23 may be re-circulated as a part of the second coolant 22, the remaining part of the concentrated solution 23 is typically discharged over one or more blow down pumps 40b.

The process in the 'once through' desalination system as illustrated in the schematic FIG. 12, differs from the 'brine recirculation' system primarily in the coolant flow. Only a first coolant 20, typically non-concentrated seawater, is used for all the tube bundles 10 of the evaporator 1. This first coolant 20 may be also treated with chemicals to prevent scaling of the tube bundles 10. The concentrated solution 23 is typically discharged from the last flash stage 4n over the blow down pump(s) 40b.

In the brine recirculation process as well as in the once through process, the accumulated distillate 24 is typically discharged from the last flash stage 4n over the distillate pump(s) 40c.

Figure 13:
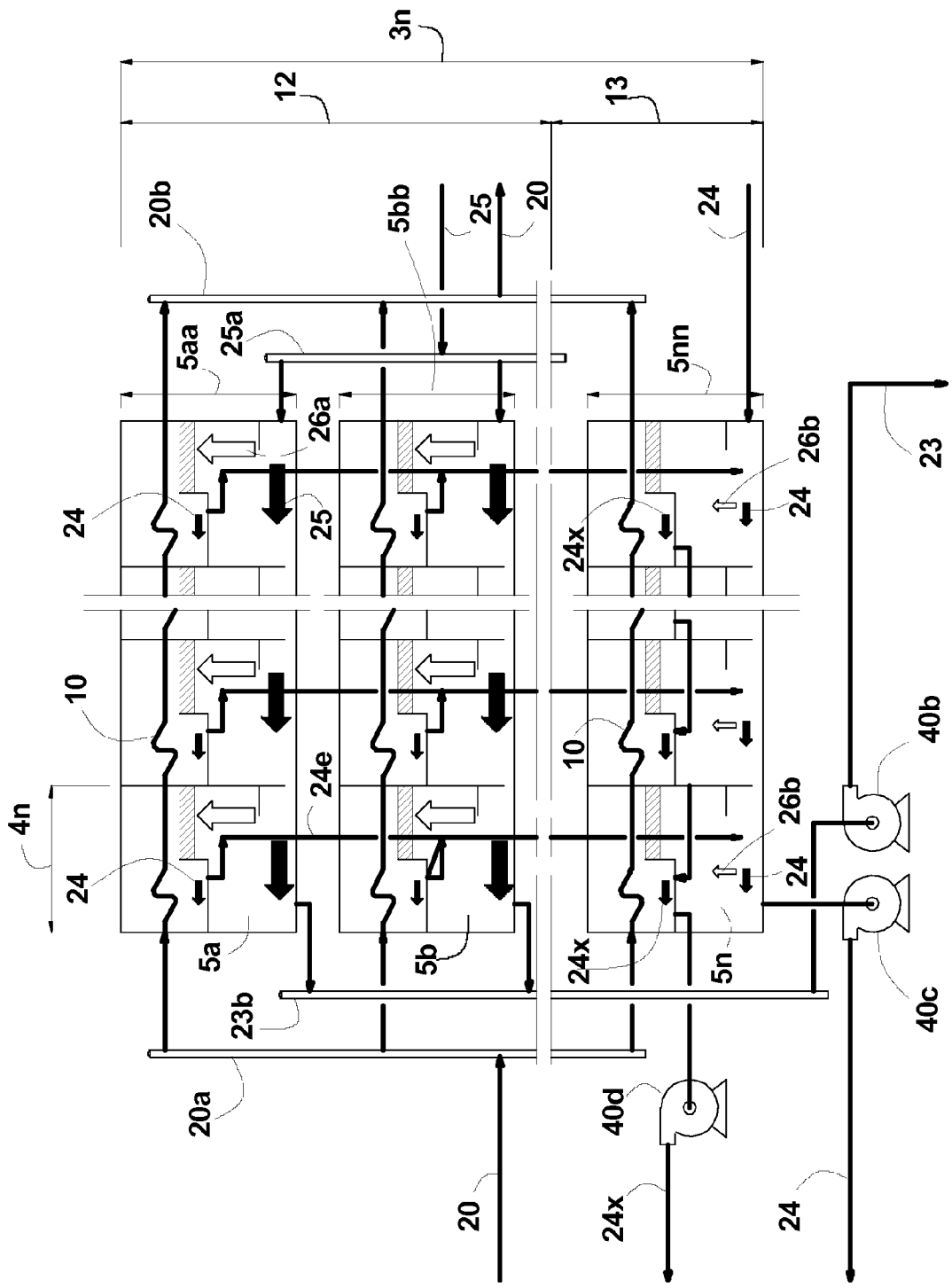
FIG. 13 shows a simplified flow schematic of the bottom tier of a multi stage flash long tube evaporator in which high purity distillate generated from the second vapor released from the accumulated distillate in the second flash stage parts is collected separately from the distillate which is mainly generated from the first vapor released from the solution in the first flash stage parts.

An exemplary schematic of the bottom tier in which the distillate 24 is accumulated and conveyed in the second flash stage parts 13 and the high purity distillate 24x is accumulated separate from the distillate 24 is shown in FIG. 13. This schematic corresponds with the configuration of the bottom tier 3n of the evaporator 1 shown in the FIG. 7 to 9. The schematic shows the parallel arranged flash stage element rows 5aa, 5bb . . . , 5nn in the bottom tier 3n with the individual tube bundles 10, fed with the first coolant 20 over the inlet header 20a in parallel. The solution 25 is conveyed in the first flash stage parts 12, while distillate 24 is primarily accumulated and conveyed in the second flash stage parts 13, which is in the example shown in FIG. 13 identical with the row of flash stage elements 5nn. The distillate 24 is extracted by distillate pump(s) 40c on the last flash stage 4n, while the high purity distillate 24x is extracted by high purity distillate pump(s) 40d. Distillate 24 accumulated from condensing first vapor 26a and second vapor 26b on the individual tube bundle elements 10f located in the first flash stage parts 12, may be in each of the flash stages directly conveyed into the second flash stage parts 13 through pipe connections or ducts 24e as indicated in FIG. 13, or may be conveyed through a plurality of flash stages in the first flash stage parts 12, before being conveyed into a second flash stage part 13, or may be extracted from the first flash stage part 12 of the last flash stage 4n directly.

The configurations described and shown in FIG. 1-13 provide the general concept of the present invention. The shown details should be considered as examples whereby other forms, shapes or configurations of individual parts, like for instance tube bundles 10 of circular shape may be used, solution orifices 7a, distillate orifices 7b and 7c and splash hoods 8 may be designed in a different way than shown, shell parts like the shell bottom 2a, shell roof 2b, left side wall 2c, right side wall 2d, front wall 2e and end wall 2f, horizontal tier partitions 6a and flash stage partition walls 6c may be curved or may be shaped in other forms than the flat plates shown in FIG. 1 to 10.

The transport of first coolant 20 and second coolant 22 to the tube bundles 10, the collection of the first coolant 20 and second coolant 22 discharging from the tube bundles 10 as well as the transport of the first and second coolant 20 and 22 from the plurality of tube bundles 10 located in one tier to the plurality of tube bundles 10 located in the next tier directly above, may be realized by individual pipes connected to the water boxes 11. Coolant inlet headers 20a for the first coolant, coolant inlet headers 22a for the second coolant, coolant outlet headers 20b, for the first coolant and coolant outlet headers 22b for the second coolant as shown in the schematics FIGS. 11 and 12 may be installed, so that the first coolant 20 or second coolant 22 fed in parallel to the plurality of tube bundles 10 or discharging in parallel from the plurality of tube bundles 10 of one tier is in fluid communication. Similarly, the transport of the solution 25 from one tier to the next tier located directly below, may be realized by a plurality of individual pipes connected to a plurality of solution inlet nozzles 25c and solution outlet nozzles 25d installed over the width of the flash stages in the front wall 2e and end wall 2f of the individual tiers 3a, 3b . . . to 3n as shown in FIG. 2 to 10. Those pipes may be also interconnected by solution inlet headers 25a and solution outlet headers 25b as shown in the schematics FIG. 11 to 13. Also outlet nozzles 23a for the concentrated solution 23 may be installed on the last flash stage 4n as indicated in FIGS. 2, 3, 5 and 10, which may be also connected with a concentrated solution outlet header 23b. For the transport of the distillate 24, also interconnecting distillate inlet headers 24a and distillate outlet headers 24b may be installed on the individual tiers to interconnect distillate pipes or ducts connected to the tube bundle shrouds 10 or second channels 16 as indicated in the FIG. 11 to 13, or distillate inlet nozzles 24c and distillate outlet nozzles 24d may be installed as indicated for example in FIG. 8. Instead of inlet and outlet nozzles, headers and piping connections for the transport of the first coolant 20, second coolant 22, solution 25 and distillate 24 as described above, also ducts located inside or outside the evaporator shell 2 or other means of transportation devices may be used for the same purpose.

An evaporator 1 and its parts may be configured to have the second flash stage parts 13 located in a different position than described and shown in the FIGS. 6, 7, 9 and 13, like for example occupying one or more than one of the intermediate rows of flash stage elements 5bb, 5cc, . . . , which would eventually require additional longitudinal partition walls 6d, 6e or 6f, but the principal purpose, allowing to accumulate the distillate 24 or accumulating the distillate 24 and producing in addition a high purity distillate 24x in the second flash stage parts 13, would remain the same.

The accumulation of the distillate 24, release of the second vapor 26b from the accumulated distillate 24, condensation and accumulation of high purity distillate 24x outside the evaporator 1, in a separate attached apparatus, would be possible as well.

Details like the venting of non-condensable gases from the tube bundles 10 are not shown, since those are commonly known details for tube bundles or evaporators.

The ring space between tubes 10a and tube holes in the flash stage partition walls 6c may be minimized by installation of suitable sleeves (details are not shown) to minimize the vapor passage from one flash stage into the next flash stage through the ring spaces, if considered necessary.

For structural reasons, an evaporator 1 may be designed such, that at least a part of the flash stage partition walls 6c located in a plurality of tiers are lined up vertically, however, flash stage partition walls 6c may be located in individual tiers in any position, regardless of the location of partition walls 6c in other tiers. Also each individual tier may be designed with a number of flash stages as considered as required or most suitable.

Also an evaporator may be configured having in individual tiers different numbers of flash stage element rows 5aa-5nn, respectively different numbers of tube bundles 10.

With the configuration of a plurality of flash stage element rows 5aa, 5bb . . . , 5nn in the individual tiers, each comprising an individual tube bundle 10, there is basically no limitation in unit capacity of an evaporator 1, since the width of the evaporator 1 between the left side wall 2c and the right side wall 2d and the number of flash stage element rows 5aa to 5nn with individual parallel fed tube bundles 10 can be adjusted as required for a desired evaporator unit capacity.

The multi stage flash long tube evaporator 1 of the present invention may be divided horizontally into a plurality of at least two individual evaporator modules, wherein each evaporator module would comprise at least one of the plurality of tiers 3a to 3n.

Figure 14:
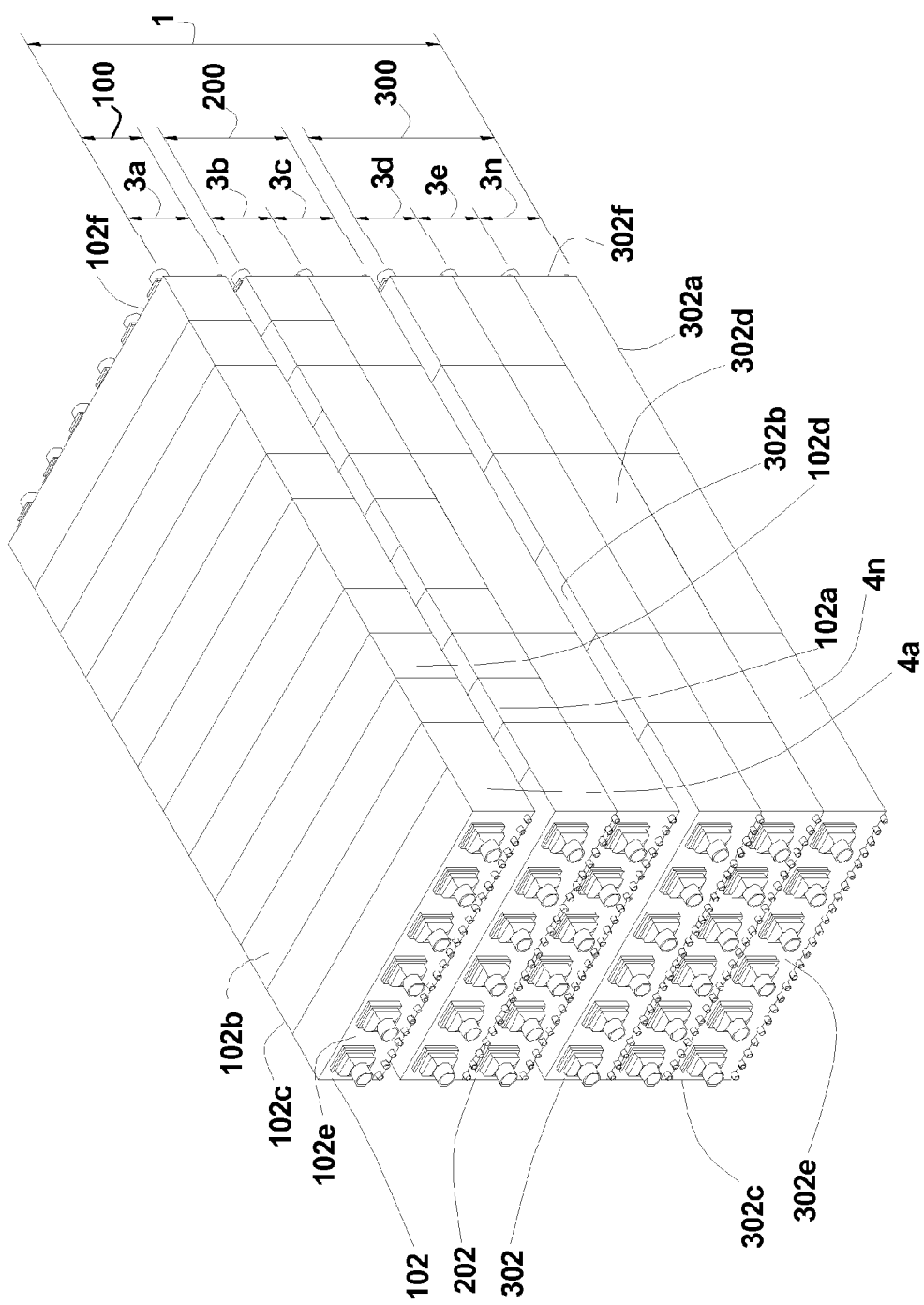
FIG. 14 shows an example of the multi stage flash long tube evaporator comprising of 3 modules, wherein each module comprises at least one of the total number of tiers of the evaporator.

A typical example is shown in FIG. 14 with a first evaporator module 100, a second evaporator module 200 and a third evaporator module 300. In the example shown in FIG. 14, the first evaporator module 100 comprises the top tier 3a, the second evaporator module 200 comprises the intermediate tiers 3b and 3c and the third evaporator module 300 comprises the intermediate tiers 3d, 3e and the bottom tier 3n. Such separation of an evaporator into individual evaporator modules may be applied if considered more feasible or more economical. For example, the first evaporator module 100 may be designed for a higher operation pressure than the second and third evaporator module 200 and 300, reducing eventually the overall cost, compared to an evaporator 1 not divided into individual modules and designed completely for the higher operation pressure.

Figure 15:
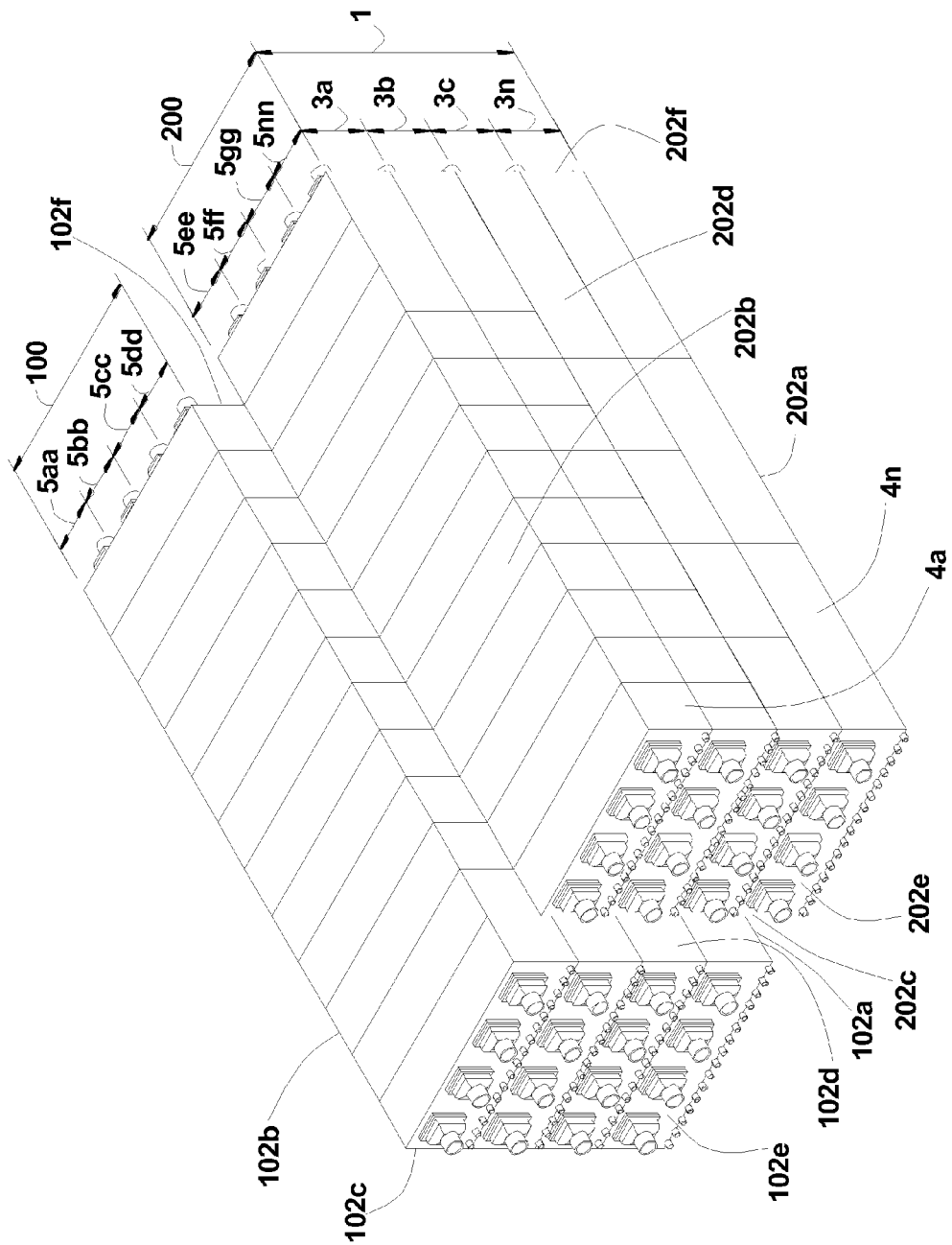
FIG. 15 shows an example of the multi stage flash long tube evaporator comprising of 2 modules, wherein each module comprises a part of the total number of flash stage element rows of each tier of the evaporator.

Similarly an evaporator 1 may be divided vertically and in longitudinal direction into a plurality of at least two evaporator modules. In this case each of the evaporator modules would comprise a part of the plurality of rows of flash stage elements 5aa to 5nn of each of the plurality of tiers 3a to 3n of the evaporator 1. As an example, FIG. 15 shows a first evaporator module 100 comprising the rows of flash stage elements 5aa to 5dd of each of the tiers 3a to 3n, while the second evaporator module 200 comprises the rows of flash stage elements 5ee, 5ff, 5gg and 5nn of each of the tiers 3a to 3n.

In both described options of evaporator configurations, each of the evaporator modules comprises an individual evaporator module shell, like indicated for example in FIG. 14, the evaporator module 100 comprising the evaporator module shell 102, the evaporator module 200 the comprises evaporator module shell 202 and the evaporator module 300 comprises the evaporator module shell 302. Each evaporator module shell comprises an individual shell bottom, shell roof, left side wall, right side wall, front wall and end wall, like indicated as examples in FIG. 14-15 for the evaporator module 100, a shell bottom 102a, a shell roof 102b, a left side wall 102c, a right side wall 102d, a front wall 102e and a end wall 102f, or as indicated as example in FIG. 15 for the evaporator module 200 a shell bottom 202a, a shell roof 202b, a left side wall 202c, a right side wall 202d, a front wall 202e and a end wall 202f or as indicated as example in FIG. 14 for the evaporator module 300 a shell bottom 302a, a shell roof 302b, a left side wall 302c, a right side wall 302d, a front wall 302e and a end wall 302f.

The wall thickness of evaporator shell parts and sizes of individual parts shown in the FIGS. 1-10 and 14-15, are partly not shown in true proportion to the evaporator size, but are shown significantly larger for clarity purpose of the design concept.

The basic concept of the evaporator 1 of the present invention, which is a multi stage flash long tube evaporator with a multiple tier configuration, comprising a plurality of at least 3 tiers and comprising a plurality of at least 3 parallel arranged tube bundles 10 in each tier 3a to 3n, may be also used for desalination systems other than the described 'recirculation system' or 'once through' system. Also coolants of different types than the described seawater and re-circulating brine may be used and different type of coolant or make up water treatment may be applied.

The expression 'longitudinal' used in the description of the evaporator 1 is the direction of the flow of the solution 25, while the expressions 'transversal' relate to the orientation perpendicular to the flow direction of the solution 25. The expression 'front' relates to the evaporator side where the first flash stage 4a is located in the top tier 3a, while the expression 'end' relate to the opposite side of the evaporator 1. The expression 'left' and 'right' are orientations related to a view direction from the 'front' toward the 'end'.

Expressions like 'front', 'end', 'left', 'right', 'top', 'bottom', 'longitudinal', 'transversal' in conjunction with the description of the evaporator parts, parts configuration, flow direction etc. are used for the purpose to provide a clear understanding of the design concept of the present invention. However, an evaporator may be designed and build for example in mirror image configuration, or other orientation related expressions may be used.

Although an exemplary embodiment of the invention has been described above by way of example only, it will be understood by those skilled in the field that modifications may be made to the disclosed embodiment without departing from the scope of the invention, which is defined by the appended claims.

What is claimed is:

1. A multi stage flash long tube evaporator, comprising:
an evaporator shell formed substantially by a shell bottom, a shell roof, a left side wall, a right side wall, a front wall and an end wall;
wherein the shell bottom and shell roof are substantially of rectangular shape and arranged substantially in a horizontal position, while the left side wall, the right side wall, the front wall and the end wall are also substantially of rectangular shape and are arranged substantially in a vertical position;
the multi stage flash long tube evaporator comprising further:
a plurality of horizontal tier partitions, each substantially extending from the left side wall to the right side wall and from the front wall to the end wall, and being arranged substantially in a horizontal position in between the shell bottom and shell roof, dividing the evaporator shell internally into a plurality of at least 3 tiers, with a top tier formed between the shell roof and a first horizontal tier partition, a bottom tier formed between the shell bottom and a second horizontal tier partition and at least one intermediate tier formed between the top tier and the bottom tier;
a plurality of flash stage partition walls, at least one of each being installed in each of the top tier, intermediate tiers and bottom tier, the flash stage partition walls being arranged in the individual tiers substantially vertically and in parallel to the front wall and end wall and extending from the left side wall to the right side wall, dividing the individual tiers into a plurality of flash stages, with a first flash stage located in the top tier next to the front wall, a plurality of intermediate flash stages and a last flash stage located in the bottom tier;
wherein each flash stage comprising of a plurality of at least three flash stage elements arranged side by side in a transversal direction between the left side wall and the right side wall, wherein all flash stages located in an individual tier are comprising of the same number of flash stage elements and the flash stage elements of the flash stages in an individual tier are forming in a longitudinal direction between the front wall and the end wall a plurality of flash stage element rows;
wherein each flash stage element row comprising a single pass tube bundle, so that each tier comprises a plurality of at least three tube bundles, and
wherein each tube bundle is substantially extending between the front wall and the end wall, and being divided by the flash stage partition walls located in the individual tiers, into a plurality of tube bundle elements, so that each flash stage element comprises one tube bundle element, and
means are provided to feed a solution into the first flash stage while openings in the partition walls allow the solution to pass from one flash stage to the next in each tier, while further means are provided to allow the solution to pass from a flash stage located in one tier to the next flash stage located in the tier directly below, such that the solution is passing
through all flash stages and tiers in a serial flow arrangement from the first flash stage located in the top tier to the last flash stage located in the bottom tier, and
wherein the openings in the partition walls are sized such, that the solution can pass from one flash stage to the next, while avoiding any vapor to pass through the openings, so that the solution would flash down in each flash stage to a lower temperature compared to the temperature of the solution in the previous flash stage, a first vapor would be released from the solution in each flash stage, and would condense substantially on the tube bundle elements located in the individual flash stage where it is released.

2. A multi stage flash long tube evaporator of claim 1 comprising:
a plurality of tube bundle shrouds, one of each enclosing the lower part of one of the plurality of tube bundle elements of at least one of the plurality of tube bundles of at least one tier;
wherein each tube bundle shroud is arranged such, that the first vapor released from the solution in a flash stage, would be guided to enter into the upper part of the tube bundle element, while the tube bundle shroud would also function as a distillate tray, to collect the distillate generated from the first vapor condensing at the individual tube bundle element, and
wherein at least below one of the plurality of tube bundles in at least one tier, openings are provided in the partition walls, to allow the distillate accumulated, to pass in the tube bundle shrouds from one flash stage to the next, so that the accumulated distillate would flash down in each consecutive flash stage to a lower temperature compared to the distillate temperature in the previous flash stage and would release a second vapor which would also condense on the tube bundle elements, and wherein the tube bundle shrouds are located in the individual tiers at an elevation above the horizontal tier partition or above the shell bottom, to allow the solution to pass over the entire width of a flash stage between the left side wall on top of the horizontal tier partition or on top of the shell bottom, through the flash stages.

3. A multi stage flash long tube evaporator of claim 2 in which at least one of the tiers comprises:

a longitudinal partition wall being arranged substantially vertically and in parallel to the left side wall and right side wall and extending substantially from the front wall to the end wall and dividing each flash stage of the at least one tier into a first flash stage part and a second flash stage part;

wherein the longitudinal partition wall being located in between two tube bundles, so that the tube bundle elements of at least one tube bundle and the tube bundle shrouds located at the same tube bundle elements are located in the second flash stage parts, and;

wherein the solution is conveyed only in the first flash stage parts of the at least one tier on top of the horizontal tier partition or on top of the shell bottom located below the tube bundles of the at least one tier, while means are provided to transport distillate accumulated in individual tube bundle shrouds of at least one flash stage of the at least on tier into the second flash stage part of the same flash stage, so that the distillate would be accumulated and conveyed on top of the same horizontal tier partition or shell bottom in the second flash stage parts.

4. A multi stage flash long tube evaporator of claim 3 in which:

the longitudinal partition wall located in at least one tier is separating the first and second flash stage parts such, that only the second vapor released from distillate accumulated in the second flash stage parts can condense on the tube bundle elements located in the second flash stage parts, and wherein the distillate generated from the condensing second vapor in the second flash stage parts is accumulated and conveyed in the tube bundle shrouds located in the second flash stage parts as a high purity distillate.

5. A multi stage flash long tube evaporator of the claim 1 comprising in at least one tier a plurality of tube bundle walls, the tube bundle walls being arranged substantially in parallel to the left side wall and right side wall, extending from the front wall to the end wall and from the horizontal tier partition or shell bottom located directly below the tube bundles of the at least one tier upwards;

wherein the tube bundle walls having a height to leave a space between the top of the tube bundle wall and the shell roof or horizontal tier partition located directly above, to allow vapor to pass above the tube bundle walls into the tube bundles of the at least one tier, and wherein the tube bundle walls being further arranged such, to form together with the horizontal tier partition or shell bottom located below the tube bundles of the at least one tier, a plurality of first channels and a plurality of second channels wherein the second channels located directly below each of the plurality of tube bundles of the at least one tier either in between two tube bundle walls located on either side of an individual tube bundle, or in between the left side wall or right side wall and one tube bundle wall, while the first channels being located in the spaces between the left side wall and right side wall not occupied by the second channels;

wherein the solution would be conveyed in the first channels on top of the aforesaid horizontal tier partition or on top of the shell bottom through the flash stages of the at least one tier, and wherein the distillate would be accumulated and conveyed in the second channels located below the tube bundles, in parallel to the solution on top of the aforesaid horizontal tier partition or shell bottom, wherein, openings are provided in the partition walls, to allow the distillate accumulated, to pass in the second channels from one flash stage to the next, so that the accumulated distillate would flash down in each consecutive flash stage to a lower temperature compared to the distillate temperature in the previous flash stage and would release a second vapor which would also condense on the tube bundle elements.

6. A multi stage flash long tube evaporator of claim 1, wherein means are provided to feed a first coolant into the tube bundle elements located in the last flash stage in the bottom tier, and, wherein further means are provided to convey the first coolant discharging from the plurality of single pass tube bundles of one tier, to the plurality of single pass tube bundles of the tier located directly above, and where further means are provided to receive the first coolant, discharging from the tube bundle elements located in the first flash stage in the top tier, such that the first coolant flows through all tube bundles located in the same tier into the same direction and in parallel and from all tube bundles located in one tier to all tube bundles located in the tier above in serial flow communication.

7. A multi stage flash long tube evaporator of claim 1, wherein means are provided to feed a first coolant into the tube bundle elements located in the last flash stage in the bottom tier, and wherein further means are provided to receive the first coolant discharging from the plurality of single pass tube bundles of the bottom tier, such that the first coolant flows through all tube bundles located in the bottom tier into the same direction and in parallel, and wherein further means are provided to feed a second coolant into the plurality of tube bundle elements of the flash stage located directly above the flash stage of the bottom tier from which the first coolant is discharging, and wherein further means are provided to convey the second coolant discharging from the plurality of single pass tube bundles of one tier to the plurality of single pass tube bundles of the tier located directly above, and wherein further means are provided to receive the second coolant discharging from the tube bundle elements located in the first flash stage in the top tier such that the second coolant flows through all tube bundles located in the same tier into the same direction and in parallel and from all tube bundles located in one tier to all tube bundles located in the tier above in serial flow communication.

* * * * *